US009694999B2

(12) United States Patent
Lee

(10) Patent No.: US 9,694,999 B2
(45) Date of Patent: Jul. 4, 2017

(54) SCANNER DEVICE AND IMAGE FORMING APPARATUS INCLUDING THE SAME

(71) Applicant: Samsung Electronics Co., Ltd., Suwon-si, Gyeonggi-do (KR)

(72) Inventor: Jung-hoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/608,541

(22) Filed: Jan. 29, 2015

(65) Prior Publication Data
US 2015/0344247 A1 Dec. 3, 2015

(30) Foreign Application Priority Data

May 30, 2014 (KR) ........................ 10-2014-0066529

(51) Int. Cl.
*B65H 3/06* (2006.01)
*B65H 3/52* (2006.01)
*H04N 1/00* (2006.01)

(52) U.S. Cl.
CPC ....... *B65H 3/5261* (2013.01); *H04N 1/00543* (2013.01); *H04N 1/00551* (2013.01); *B65H 2402/441* (2013.01); *B65H 2404/144* (2013.01)

(58) Field of Classification Search
CPC .. B65H 3/5215; B65H 3/5223; B65H 3/5261; B65H 3/5269; B65H 2402/441; B65H 2404/1421; B65H 2404/144; B65H 2404/1521; H04N 1/00551; H04N 1/00543

USPC .................................................. 271/273, 274
See application file for complete search history.

(56) References Cited

U.S. PATENT DOCUMENTS

| | | | |
|---|---|---|---|
| 4,737,820 A | 4/1988 | Murray | |
| 7,584,954 B2* | 9/2009 | Nagao | B65H 3/5261 271/10.03 |
| 2005/0127598 A1 | 6/2005 | Nagura | |
| 2007/0045945 A1 | 3/2007 | Iwago | |
| 2008/0191412 A1 | 8/2008 | Tu | |
| 2008/0246208 A1 | 10/2008 | Akiyama et al. | |
| 2010/0061781 A1 | 3/2010 | Won | |
| 2011/0309569 A1* | 12/2011 | Huang | B65H 3/0684 271/109 |
| 2012/0074643 A1 | 3/2012 | Imura | |
| 2012/0170087 A1 | 7/2012 | Nose et al. | |
| 2015/0329303 A1* | 11/2015 | Xie | B65H 5/068 271/273 |

OTHER PUBLICATIONS

Extended European Search Report mailed Mar. 3, 2016 in European Patent Application No. 15 15 7731.9.

* cited by examiner

*Primary Examiner* — Jeremy R Severson
(74) *Attorney, Agent, or Firm* — Staas & Halsey LLP

(57) ABSTRACT

A scanning device and an image forming apparatus are provided. The scanning device includes a position-changing module that is provided on a base frame separately from a cover and changes a position of at least one selected from a pickup module and a friction module to release a nip that is formed between the pickup module and the friction module. Thus, paper jams may be easily solved and the nip may be prevented from being unnecessarily released.

20 Claims, 24 Drawing Sheets

SCANNER DEVICE AND IMAGE FORMING APPARATUS INCLUDING THE SAME

CROSS-REFERENCE TO RELATED APPLICATIONS

This application is related to, and claims the priority benefit of, Korean Patent Application No. 10-2014-0066529, filed on May 30, 2014, in the Korean Intellectual Property Office, the disclosure of which is incorporated herein in its entirety by reference.

BACKGROUND

1. Field

One or more embodiments relate to a scanner device that reads out an image from a document and an image forming apparatus including the scanner device.

2. Description of the Related Art

A scanner device refers to a device that emits light to a document, receives light reflected from the document, and reads an image written to the document. A scanner device may use a flatbed method in which a document may be located at a fixed position and an image may be read as a readout member such as a contact image sensor (CIS) or a charge-coupled device (CCD) moves, a document feeding method in which a readout member may be located at a fixed position and a document is fed, or a combination of the flatbed method and the document feeding method.

A scanner device may be used alone or as a multi-functional device combined with a copier or a printer including a printing unit that prints an image to a sheet of paper.

When a feeding error such as a paper jam or multi-feeding by which two or more documents are simultaneously fed occurs during a readout operation, a document may need to be removed from a document feed path.

SUMMARY

One or more embodiments include a scanner device so that a document may be easily removed when a document feeding error occurs and an image forming apparatus including the scanner device.

Additional aspects will be set forth in part in the description that follows and, in part, will be apparent from the description, or may be learned by practice of the presented embodiments.

According to one or more embodiments of the present invention, a scanning device includes a base frame that includes a supply tray on which a document is loaded, a pickup module that is provided on the base frame, picks up the document loaded on the supply tray, and feeds the picked-up document, a friction module that is provided on the base frame, is disposed to face the pickup module to form a nip with the pickup module, and applies a frictional force to a rear surface of the document that is passing through the nip, a readout member that reads out an image from the document that has passed through the nip, a cover that is pivotably provided on the base frame and opens or closes at least a part of a document feed path; and a position-changing module that is provided on the base frame and changes a position of at least one selected from the pickup module and the friction module to release the nip.

The friction module may be movable between a first position where the friction module contacts the pickup module to maintain the nip and a second position where the friction module is separated from the pickup module to release the nip, and the position-changing module may be configured to manually move the friction module from the first position to the second position.

The position-changing module may include a pressure rod that is contactable with the friction module and presses the friction module to move the friction module from the first position to the second position; and a pressure lever that includes a manipulation part for a user's manipulation and presses the pressure rod in order for the pressure rod to press the friction module when an external force is applied to the manipulation part.

The position-changing module may further include an elastic member that, when the pressure of the pressure rod on the friction module is removed, applies an elastic force to the pressure rod in order for the pressure rod to return to its position before the pressure.

The pressure lever may include a contact part that contacts an end portion of the pressure rod in a longitudinal direction of the pressure rod.

The contact part may include a pressure section that, when the friction module is located at the second position, presses the pressure rod, wherein the pressure section includes a locking section that prevents a position of the pressure rod from being changed and a half locking section that allows the position of the pressure rod to be changed.

When the cover is closed, the pressure lever may contact the cover and pivots to remove the pressure on the pressure rod.

The position-changing module may further include a connection link that is disposed between the pressure rod and the pressure lever and connects the pressure rod and the pressure lever.

The connection link may include a second contact part that contacts an end portion of the pressure rod in a longitudinal direction of the pressure rod and a third contact part that contacts the pressure lever, wherein the connection link may pivot about a pivotal axis that is formed between the second contact part and the third contact part.

The third contact part may include a second pressure section that is pressed by the pressure lever when the friction module is located at the second position, wherein the second pressure section includes a second locking section that prevents a position of the pressure lever from being changed and a second half locking section that allows the position of the pressure lever to be changed.

When the cover is closed, the pressure lever may contact the cover and pivot to remove the pressure on the connection link The pickup module may include a third position where the pickup module contacts the friction module to maintain the nip and a fourth position where the pickup module is separated from the friction module to release the nip, wherein the position-changing module is configured to manually move the pickup module between the third position and the fourth position.

The position-changing module may include a movable frame on which the pickup module is mounted and that is pivotable about a pivot shaft that is provided on one end portion of the movable frame and is disposed in a direction parallel to the document feed direction.

The movable frame may include a support shaft that supports the pickup module and is connected to a driving unit that is disposed on the base frame; and a movable lever that moves the support shaft away from the driving unit to remove the connection between the support shaft and the driving unit.

The movable frame may further include a torque limiter that is provided on the pivot shaft to maintain the pickup module at the fourth position.

The movable frame may further include an elastic member that applies an elastic force to the support shaft in order for the support shaft to move toward the driving unit.

According to one or more embodiments, an image forming apparatus includes the scanning device and a printing unit that forms an image on a recording medium.

BRIEF DESCRIPTION OF THE DRAWINGS

These and/or other aspects will become apparent and more readily appreciated from the following description of the embodiments, taken in conjunction with the accompanying drawings in which:

FIG. 14B is an exploded perspective view of an exemplary scanner device of;

DETAILED DESCRIPTION

Figure 1:
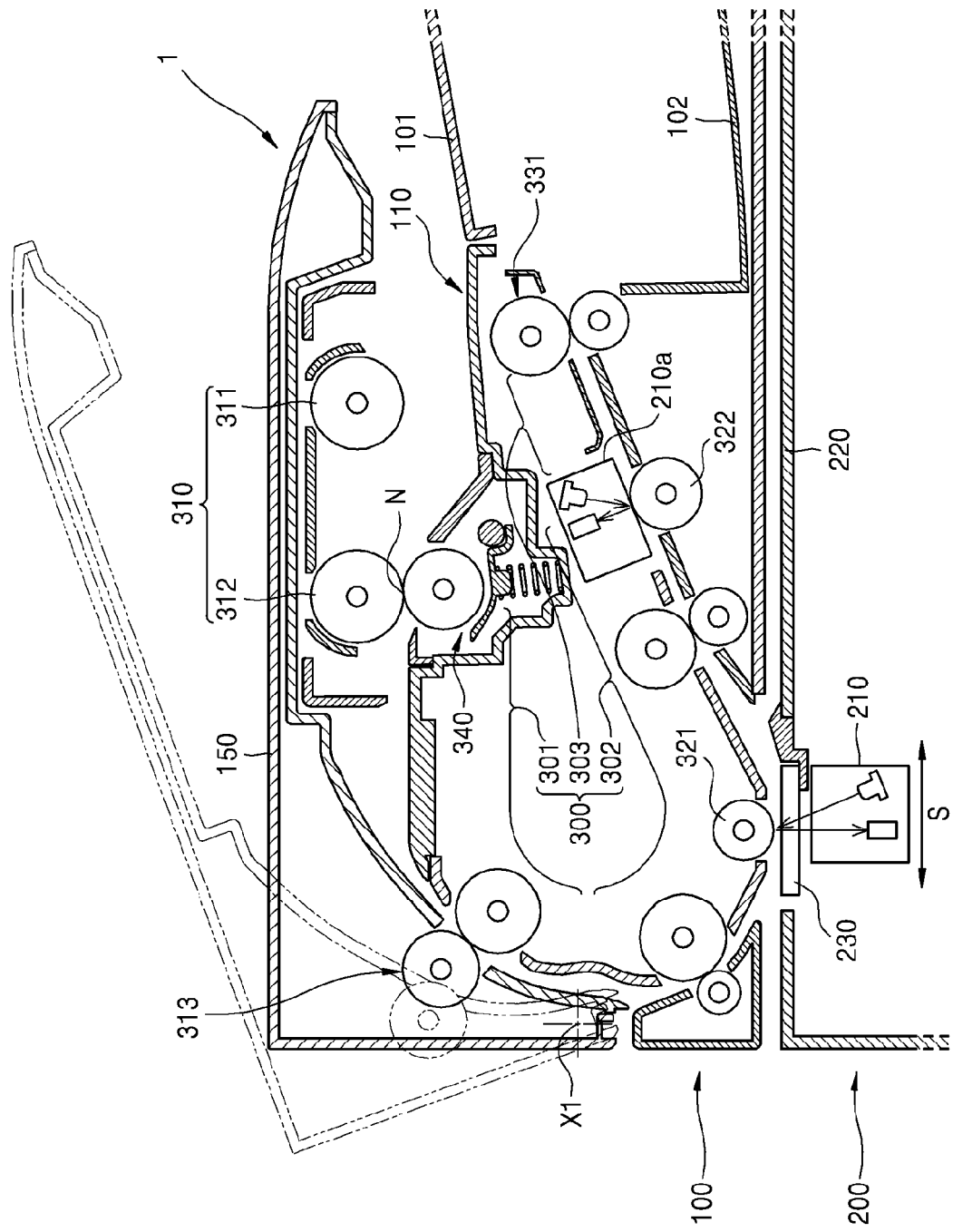
FIG. 1 is a cross-sectional view of a scanner device according to an embodiment.

The present invention is described with reference to the accompanying drawings, in which exemplary embodiments of the invention are illustrated.

The terms used herein are briefly explained and exemplary embodiments are explained in detail.

Most of the terms used herein are general terms that have been widely used in the technical art to which the present invention pertains. However, some of the terms used herein may be created reflecting intentions of technicians in this art, precedents, or new technologies. Some of the terms used herein may be defined by the applicant, as disclosed herein. Accordingly, the specific terms used herein should be understood based on the unique meanings thereof and the entire context of the disclosure.

In the present specification, it will be further understood that when a part "includes" or "comprises" an element, unless otherwise defined, the part may further include other elements, not excluding the other elements. Also, the terms, such as "unit" or "module", should be understood as a unit that processes at least one function or operation and that may be embodied by hardware, software, or a combination of hardware and software.

It will be understood that, although the terms "first", "second", etc. may be used herein to describe various elements, these elements should not be limited by these terms. These terms are only used to distinguish one element from another.

The following exemplary embodiments are described in order to enable those of ordinary skill in the art to embody and practice the invention. However, the present invention is not limited to the exemplary embodiments disclosed below, but can be implemented in various forms. Like reference numerals in the drawings denote like elements.

As used herein, the term "and/or" includes any and all combinations of one or more of the associated listed items. Expressions such as "at least one of" when preceding a list of elements, modify the entire list of elements and do not modify the individual elements of the list.

Figure 2:
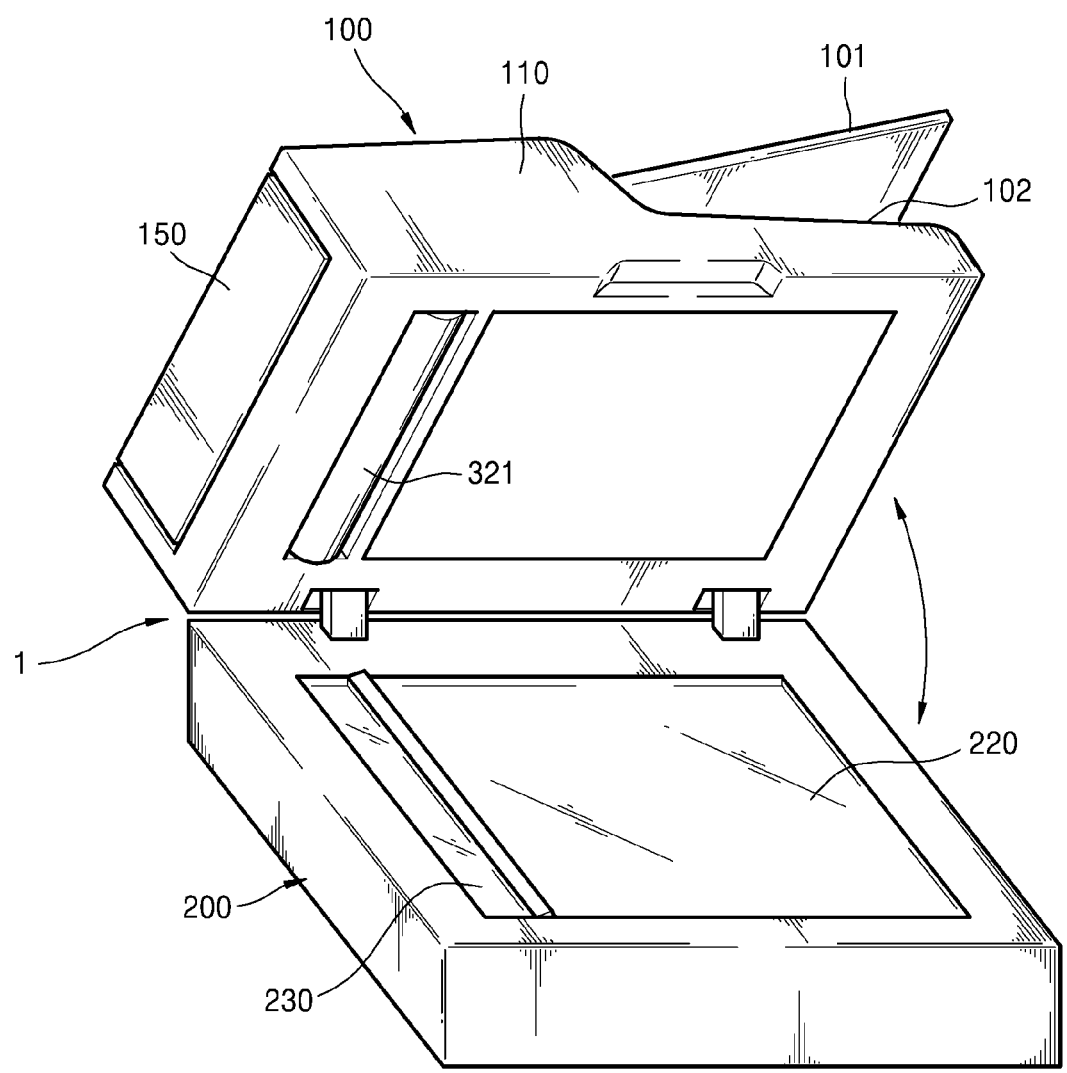
FIG. 2 is a perspective view of an exemplary scanner device illustrating a state where a document feeding unit is opened.

FIG. 1 is a cross-sectional view of a scanner device 1 according to an embodiment. FIG. 2 is a perspective view of the scanner device 1 of FIG. 1, illustrating a state where a document feeding unit 100 is opened. Referring to FIGS. 1 and 2, the scanner device 1 may include the document feeding unit 100 and a readout unit 200.

The readout unit 200 includes a readout member 210 for reading out an image from a document. The readout member 210 emits light to the document, receives light reflected from the document, and reads an image of the document. Examples of the readout member 210 may include a contact image sensor (CIS) and a charge-coupled device (CCD).

The scanner device 1 of FIG. 1 is a scanner device using a combination of a flatbed method and a document feeding method. The readout unit 200 includes a platen glass 220 on which the document may be placed to read the image from the document by using the flatbed method. The readout unit 200 includes a readout window 230 to read out the image from the document by using the document feeding method. The readout window 230 may be, for example, a transparent member. For example, a height of a top surface of the readout window 230 may be the same as a height of a top surface of the platen glass 230.

When the document feeding method is used, the readout member 210 may be located under the readout window 230. When the flatbed method is used, the readout member 210 may be located under the platen glass 220 and may be moved in a sub-scan direction S, that is, in a longitudinal direction of the document, by a moving unit (not illustrated). When the flatbed method is used, the platen glass 220 may need to be exposed to the outside in order to place the document on the platen glass 220. As illustrated in FIG. 2, the document feeding unit 100 may pivot relative to the readout unit 200. The document feeding unit 100 may pivot between a first position at which the readout unit 200 is closed and a second position at which the readout unit 200 is opened. When the document feeding unit 100 is located at the second position, the platen glass 220 may be exposed.

The document feeding unit 100 feeds the document so the readout member 210 may read the image written to the document and discharges the document that has been completely read out. The document feeding unit 100 includes a base frame 110 that includes a supply tray 101 and a discharge tray 102, a cover 150 that may be pivotably provided on the base frame 110, a pickup module 310 that may be provided on the base frame 110, and a friction module 340. A document feed path 300 may be formed in the document feeding unit 100, and the readout member 210 reads the image from the document that is being fed. The document feed path 300 may include, for example, a supply path 301, a readout path 302, and a discharge path 303. The readout member 210 may be disposed in the readout path 302, and the image written to the document may be read out by the readout member 210 while the document passes through the readout path 302. The supply path 301 for supplying the document to the readout path 302 supplies the document that is loaded on the supply tray 101 to the readout path 302 through the supply path 301. The discharge path 303 is a path for discharging the document that has passed through the readout path 302. Accordingly, the document that is loaded on the supply tray 101 may be fed through the supply path 301, the readout path 302, and the discharge path 303 and discharged to the discharge tray 102.

To perform both-side readout when the document is fed once, a readout member 210a may be additionally provided in the document feeding unit 100. The readout member 210 that is provided in the readout unit 200 reads out an image of a top surface of the document, and the readout member 210a that is provided in the document feeding unit 100 reads out an image of a rear surface of the document. The readout member 210a may be located downstream of the readout member 210 in a document feed direction.

However, a structure for both-side readout is not limited thereto, and instead of using the readout member 210a, the document may be turned over through a reverse path and the rear surface of the document may be read out by the readout member 210. In addition, it A structure for both-side readout may not be included in the scanning device 1.

A plurality of document feeding rollers to feed the document may be disposed in the document feed path 300. For example, the pickup module 310 for picking up the document loaded on the supply tray 101 and feeding the picked-up document, the friction module 340 that is disposed to face the pickup module 310, and a supply roller 313 that is disposed downstream of the pickup module 310 may be disposed in the supply path 301.

The pickup module 310 may include a pickup roller 311 that picks up the document that is loaded on the supply tray 101 and a forward roller 312 that is disposed adjacent to the pickup roller 311 and feeds the picked-up document. The pickup roller 311 and the forward roller 312 may work with each other. For example, the pickup roller 311 and the forward roller 312 may work with each other by using a belt (not illustrated).

The friction module 340 may be disposed to face the pickup module 310 and forms a nip N with the pickup module 310. The friction module 340 applies a frictional force, in a direction that is opposite to the document feed direction, to the rear surface of the document that is passing through the nip N. For example, the friction module 340 may rotate in a direction in which the document is fed in the direction that is opposite to the document feed direction, or may not rotate with a predetermined torque or less. When two or more documents are supplied between the friction module 340 and the forward roller 312, only one document may be singled out and supplied to the supply roller 313 by using a difference in a frictional force. For example, when a plurality of documents are introduced between the friction module 340 and the forward roller 312, a frictional force between the documents is less than a frictional force between the forward roller 312 and the documents and a frictional force between the friction module 340 and the documents. Accordingly, as a first document that contacts the forward roller 312 and a second document that is under the first document slide past each other, only the first document that contacts the forward roller 312 is separated and fed to the supply roller 313. The friction module 340 and the pickup module 310 are not limited to the structures of FIG. 1.

Feeding rollers 321 and 322 that respectively face the readout members 210 and 210a and feed the document may be disposed in the readout path 302. For example, the feeding roller 321 rotates by being elastically pressed by the readout window 230 that may be provided in the readout unit 200 and feeds the document that is supplied between the feeding roller 321 and the readout window 230. The feeding roller 322 that faces the readout member 210a rotates and feeds the document that is supplied between the feeding roller 322 and the readout member 210a. The readout member 210a may be elastically pressed toward the feeding roller 322 in FIGS. 1 and 2.

A discharge roller 331 that discharges the document that has been completely read out may be disposed in the discharge path 303. The discharge roller 331 may include a driving roller and a driven roller that engage with each other and rotate together.

Although not illustrated in FIGS. 1 and 2, one or more sensors that sense the document may be disposed in the supply path 301, the readout path 302, and the discharge path 303.

Since there are many reasons why a paper jam or multi-feeding may occur in the scanner device 1, it may be difficult to completely prevent such a document feeding error. Accordingly, a structure for easily removing the document when a paper jam or multi-feeding occurs is desired. Since the document may be stuck between rollers, a large amount of force may be necessary to pull out the document with the hands in the document feed direction or a direction opposite to the document feed direction, and the document may be damaged in some cases.

Since there may be many causes of a paper jam in the scanner device 1, it may be necessary to accurately detect a position where the paper jam occurs before the document is removed. Accurately detecting the position where the paper jam occurs involves determining whether the paper jam occurs in the document feed path 300 but does not necessarily involve removing contact between rollers that feed the document.

According to an embodiment of the present invention, a structure is provided where only when a user recognizes a position where a paper jam occurs and tries to remove the document, a position of at least one selected from the pickup module 310 and the friction module 340 may be manually changed. In other words, according to an embodiment of the present invention, only when the user tries to remove the document, the user may change a position of any one of the pickup module 310 and the friction module 340. Accordingly, the number of times the pickup module 310 and the friction module 340 are unnecessarily separated from each other may be reduced, and thus parameter characteristics of the pickup module 310 and the friction module 340 may be stably maintained.

Figure 3A:
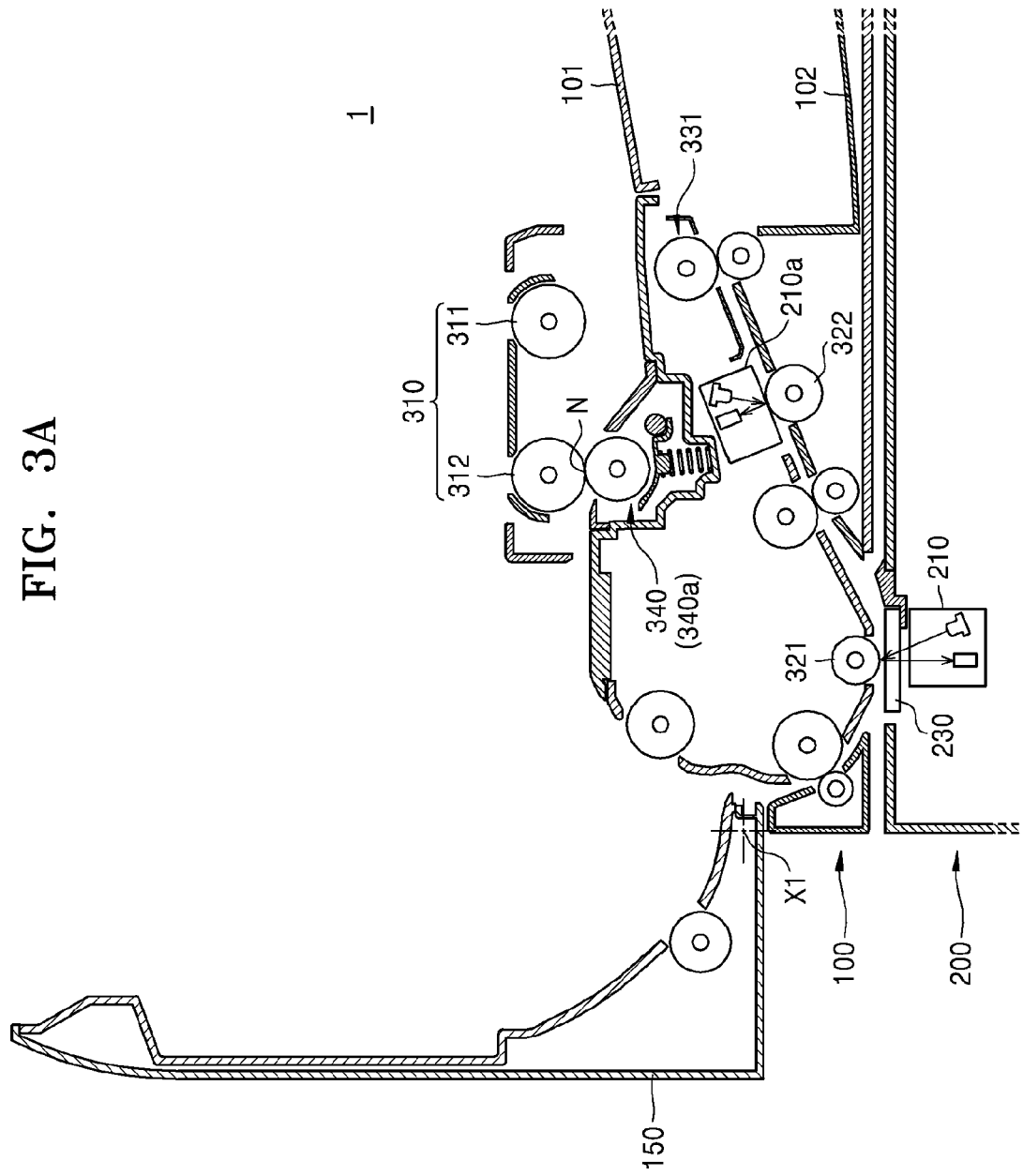
FIGS. 3A and 3B are cross-sectional views illustrating an operation to remove a paper jam of a scanner device, according to an embodiment.
Figure 3B:
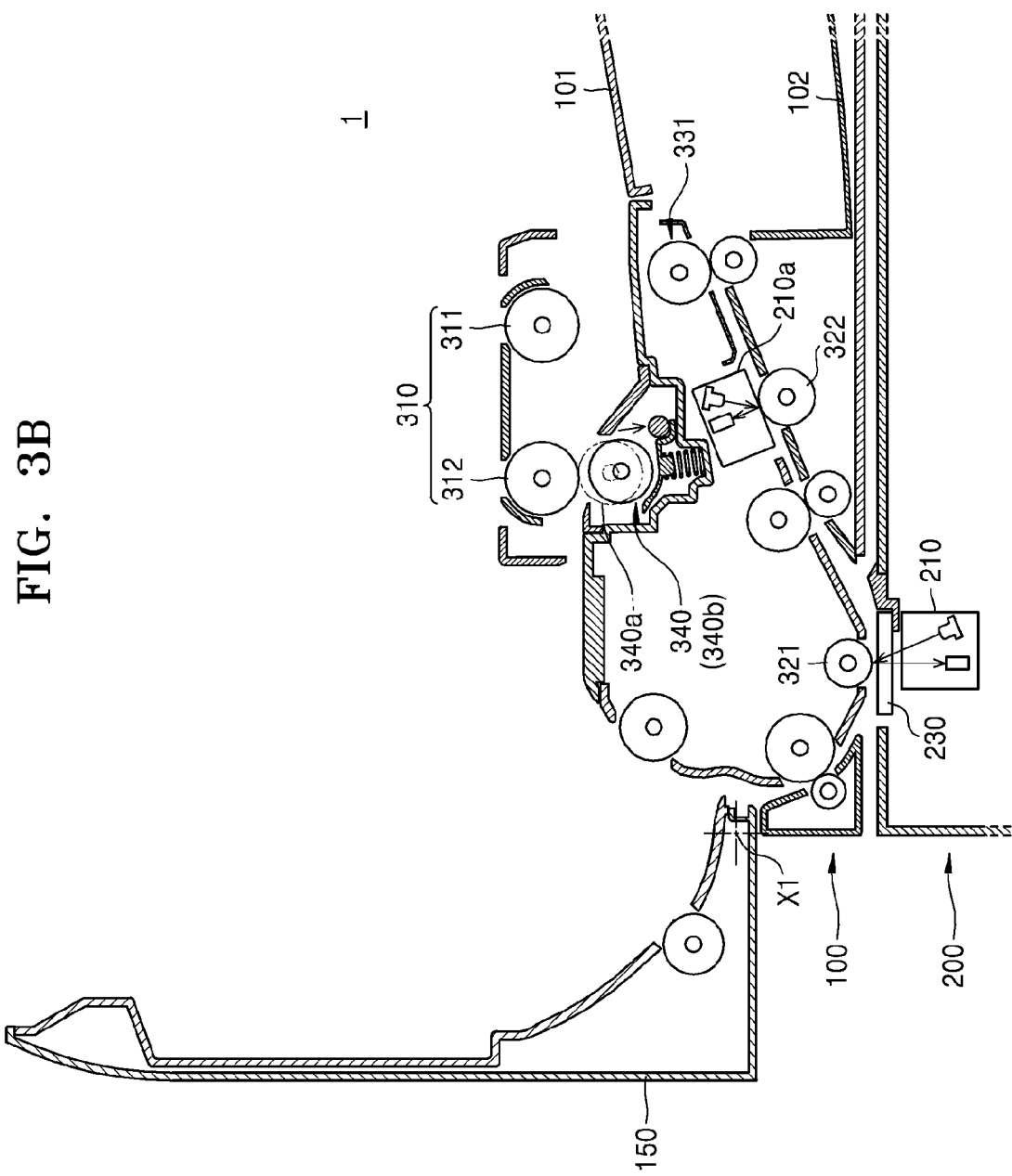
Figure 4A:
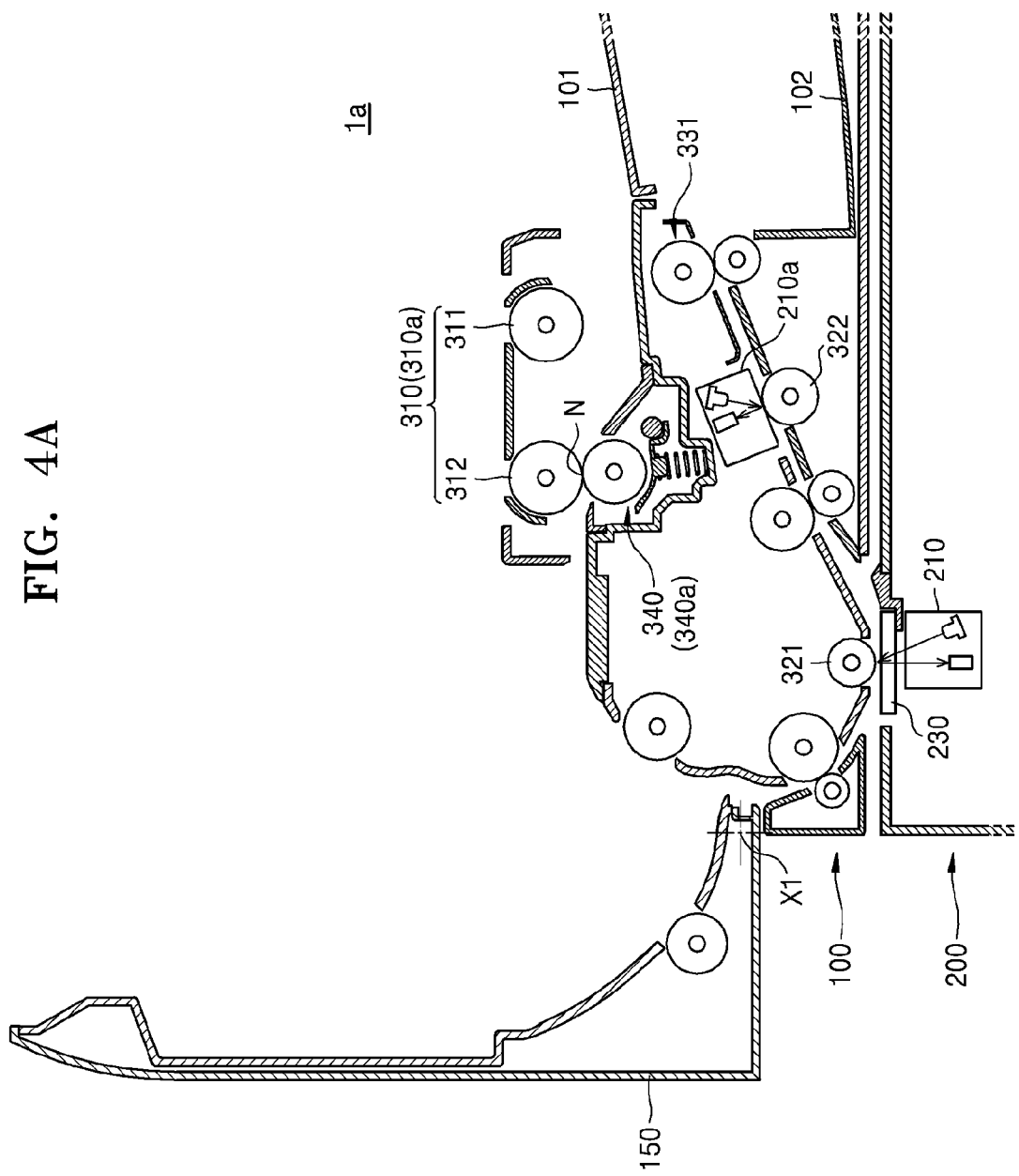
FIGS. 4A and 4B are cross-sectional views illustrating an operation to remove a paper jam of the scanner device, according to an embodiment.
Figure 4B:
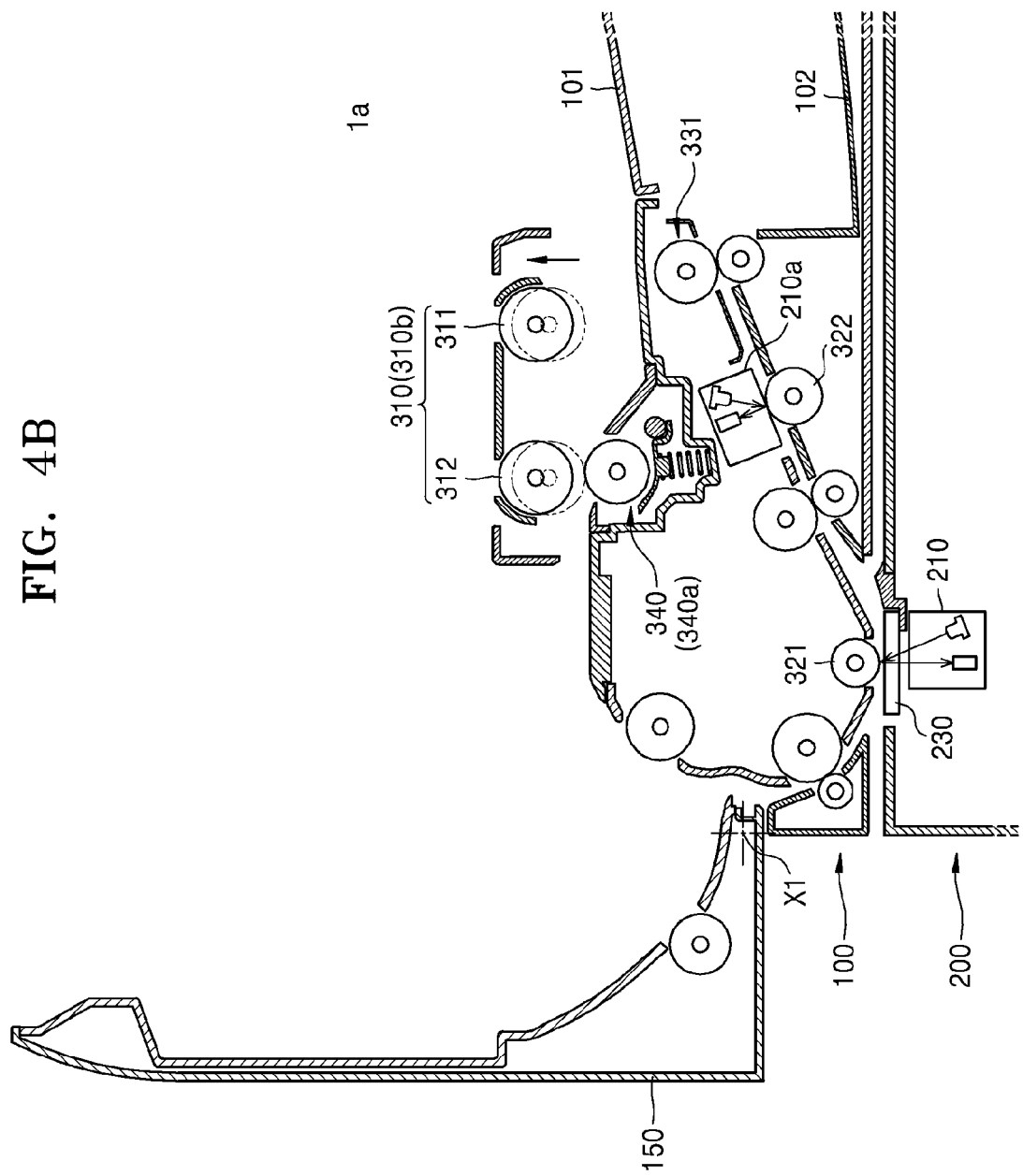

FIGS. 3A and 3B are cross-sectional views illustrating an operation to remove a paper jam of the scanner device 1, according to an embodiment of the present invention. FIGS. 4A and 4B are cross-sectional views illustrating an operation to remove a paper jam of the scanner device 1a, according to an embodiment of the present invention.

When a paper jam occurs, the user may open the cover 150 as illustrated in FIG. 3A or 4A, and determines whether the paper jam occurs in at least a part of the document feed path 300. For example, the user may determine whether the paper jam occurs in the nip N that is formed due to contact between the pickup module 310 and the friction module 340 on the document feed path 300.

When it is determined that the paper jam occurs at the nip N, the user may release the nip N that is formed between the pickup module 310 and the friction module 340. For example, the user may move the friction module 340 away from the pickup module 310 as illustrated in FIG. 3B. The user may move the friction module 340 from a first position 340a where the friction module 340 contacts the pickup module 310 to a second position 340b where the friction module 340 is separated from the pickup module 310. When the friction module 340 is located at the first position 340a, the nip N between the friction module 340 and the pickup module 310 may be maintained, and when the friction module 340 is located at the second position 340b, the nip N between the friction module 340 and the pickup module 310 may be released.

Alternatively, as illustrated in FIG. 4B, the user may move the pickup module 310 away from the friction module 340. The user may move the pickup module 310 from a third position 310a (FIG. 4A) where the pickup module 310 contacts the friction module 340 to a fourth position 310b where the pickup module 310 is separated from the friction module 340. When the pickup module 310 is located at the third position 310a, the nip N between the friction module 340 and the pickup module 310 is maintained, and when the pickup module 310 is located at the fourth position 310b, the nip N between the friction module 340 and the pickup module 310 is released. Alternatively, although not illustrated, the user may move the friction module 340 and the pickup module 310 away from each other.

Since the nip N that may be formed between the friction module 340 and the pickup module 310 may be released by changing a position of at least one selected from the friction module 340 and the pickup module 310, the user may easily remove the document without applying a great force.

When the user tries to remove the document that is located at the nip N in a state where the nip N that is formed between the friction module 340 and the pickup module 310 is not released, the user may have to pull out the document with a large force, which may affect user convenience and increase the risk of damage to the document. The term "large force" used herein may refer to a force equal to, or greater than, a frictional force that may be applied to the document at the nip N, or may refer to a force large enough to rotate the pickup module 310 or the friction module 340.

When the nip N is automatically released whenever the cover 150 is opened, a position of the pickup module 310 or the friction module 340 may be frequently changed unexpectedly. Even when the cover 150 is opened, for example, to determine whether a paper jam occurs or to perform repair, instead of removing the document, the nip N may be unnecessarily released. Due to such a frequent change in a position of the pickup module 310 or the friction module 340, parameter characteristics of the pickup module 310 and the friction module 340 may be changed. Abnormal engagement with a driving unit (not illustrated) that applies a driving force to the pickup module 310 may occur, and thus the driving unit may be worn or driving noise may be produced. When the pickup module 310 and the friction module 340 frequently contact each other and are separated from each other, abnormal engagement between the pickup module 310 and the friction module 340 may occur, and thus a paper jam, noise, and multi-feeding may occur.

According to an embodiment, even when the user opens the cover 150, the nip N that is formed between the pickup module 310 and the friction module 340 may not be released, and only when the user intentionally performs an additional operation, the nip N between the pickup module 310 and the friction module 340 may be released. Accordingly, a paper jam may be easily removed and the nip N may be prevented from being unnecessarily released.

Figure 5A:
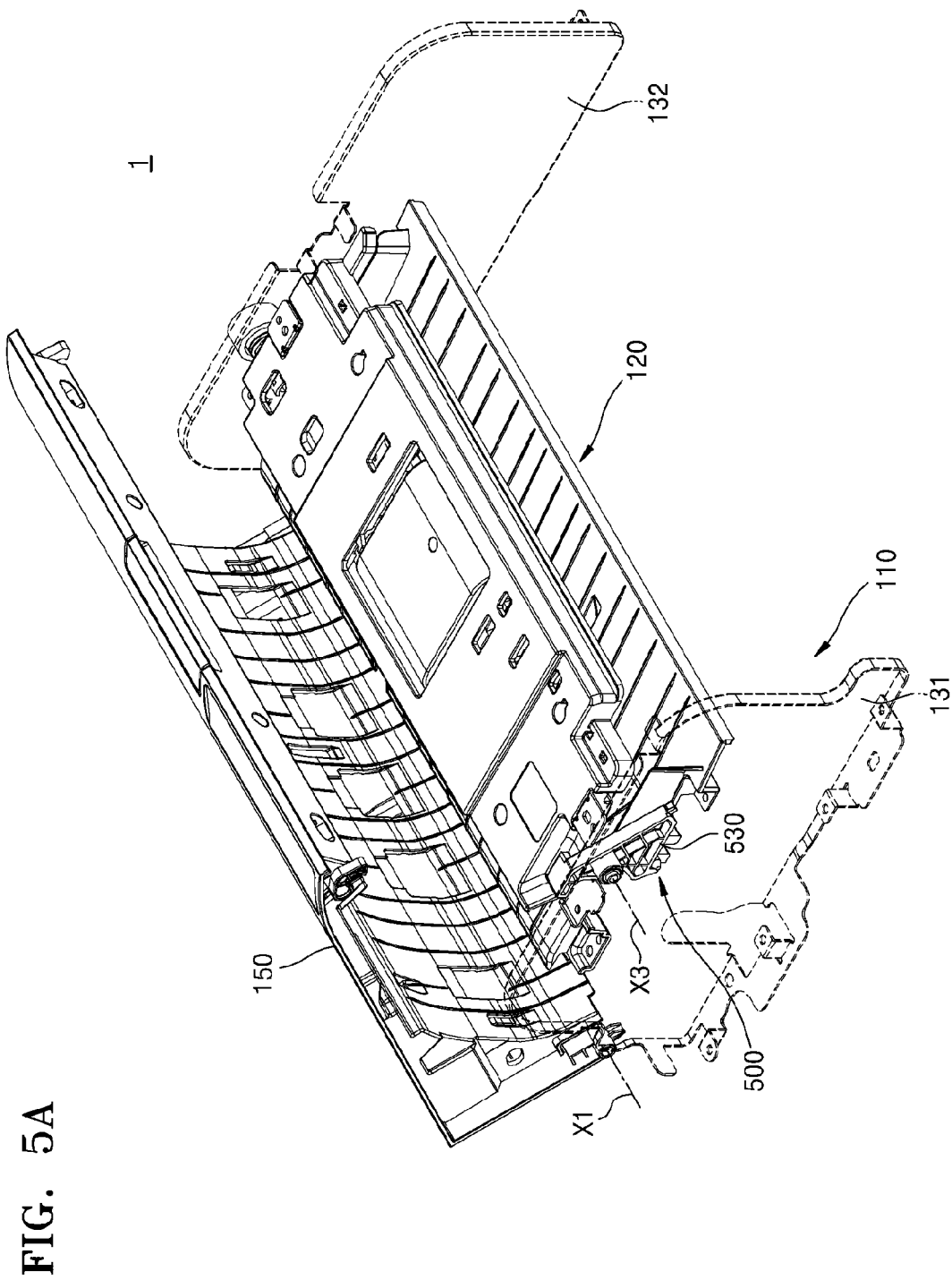
FIG. 5A is a perspective view of an assembled scanner device according to an embodiment.
Figure 5B:
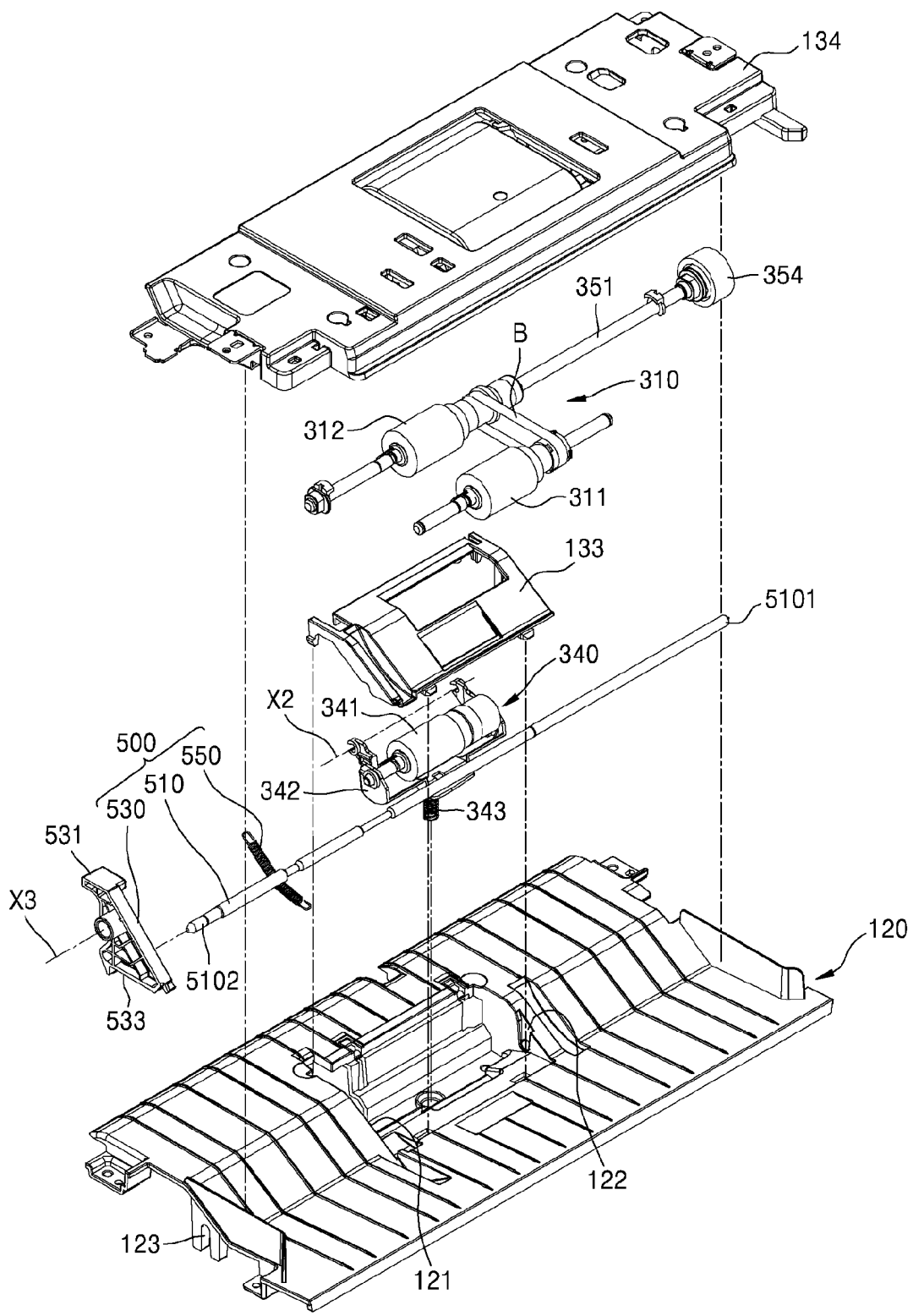
FIG. 5B is an exploded perspective view of a central frame, a pickup module, a friction module, and a position-changing module according to an embodiment.

FIG. 5A is a perspective view of the assembled scanner device 1 according to an embodiment of the present invention. FIG. 5B is an exemplary exploded perspective view of a central frame 120, the pickup module 310, the friction module 340, and a position-changing module 500 of FIG. 5A.

Referring to FIGS. 5A and 5B, the scanner device 1 includes the base frame 110 in which the pickup module 310 and the friction module 340 are provided, the cover 150 that is pivotably provided on the base frame 110, and the position-changing module 500 that changes a position of the friction module 340.

The base frame 110 includes the central frame 120 on which the pickup module 310 and the friction module 340 are provided, and lateral frames 131 and 132 that may be disposed on both sides of the central frame 120. The central frame 120 may further include housings 133 and 134 that respectively protect the friction module 340 and the pickup module 310.

The pickup module 310 may be provided on the central frame 120. The pickup module 310 includes the pickup roller 311 that picks up the document loaded on the supply tray 101 and the forward roller 312 that feeds the document picked up by the pickup roller 311. A driving gear 354 to apply a driving force for rotating the forward roller 312 may be connected to one end portion of a rotary shaft 351 of the forward roller 312. The driving gear 354 may be provided on the lateral frame 132. The pickup roller 311 and the forward roller 312 may be connected to each other by using a belt B.

The friction module 340 may be provided on the central frame 120. The friction module 340 may be disposed to face the forward roller 312 of the pickup module 310. The friction module 340 includes a first elastic member 343 that applies an elastic force to make the friction module 340 be closer to the forward roller 312. The friction module 340 that is pressed by the first elastic member 343 forms the nip N with the pickup module 310.

The friction module 340 includes a friction roller 341 that applies a frictional force to the rear surface of the document that is passing through the nip N and a holder 342 that rotatably supports the friction roller 341. The holder 342 may pivot about a pivotal axis X2 relative to the central frame 120. Due to the pivoting of the holder 342, the friction module 340 may move between the first position 340a (see, for example, FIG. 3A) where the friction roller 341 contacts the forward roller 312 and the second position 340b where the friction roller 341 may be separated from the forward roller 312.

The first elastic member 343 may be disposed between the holder 342 and the central frame 120 and applies an elastic force to the holder 342 so the holder 342 is closer to the forward roller 312.

The cover 150 may pivot about a pivotal axis X1 relative to the base frame 110. The cover 150 opens or closes at least a part of the document feed path 300. The user may determine whether a paper jam occurs around the nip N that is formed between the pickup module 310 and the friction module 340 by opening the cover 150.

The position-changing module 500 of FIGS. 5A and 5B may change a position of the friction module 340 to release the nip N that is formed between the pickup module 310 and the friction module 340. The position-changing module 500 includes a pressure rod 510 that may contact the holder 342, a pressure lever 530 that presses the pressure rod 510, and a second elastic member 550 that applies an elastic force to the pressure rod 510.

The pressure rod 510 may extend in a width direction of the document. A position of the pressure rod 510 may be changed. When the position of the pressure rod 510 is changed, the friction roller 341 that is supported by the holder 342 may be separated from the forward roller 312 by enabling the pressure rod 510 to contact and press the holder 342.

One end portion 5101 of the pressure rod 510 may be supported, for example, by the lateral frame 132 and the other end portion 5102 of the pressure rod 510 may be supported, for example, by the second elastic member 550. The pressure rod 510 may be inserted into holes 121 and 122 that may be formed in the central frame 120, and the position of the pressure rod 510 may be changed along a guide portion 123 of the central frame 120. The other end portion 5102 of the pressure rod 510 in a longitudinal direction of the pressure rod 510 may contact the pressure lever 530.

The pressure lever 530 may be pivotably provided on the lateral frame 131. The pressure lever 530 includes a manipulation part 531 to allow user manipulation and a contact part 533 that contacts the pressure rod 510. The pressure lever 530 may pivot about a pivotal axis X3. Accordingly, when the user applies an external force to the manipulation part 531 clockwise, the contact part 533 presses the pressure rod 510 in order for the pressure rod 510 to press the friction module 340.

Figure 6:
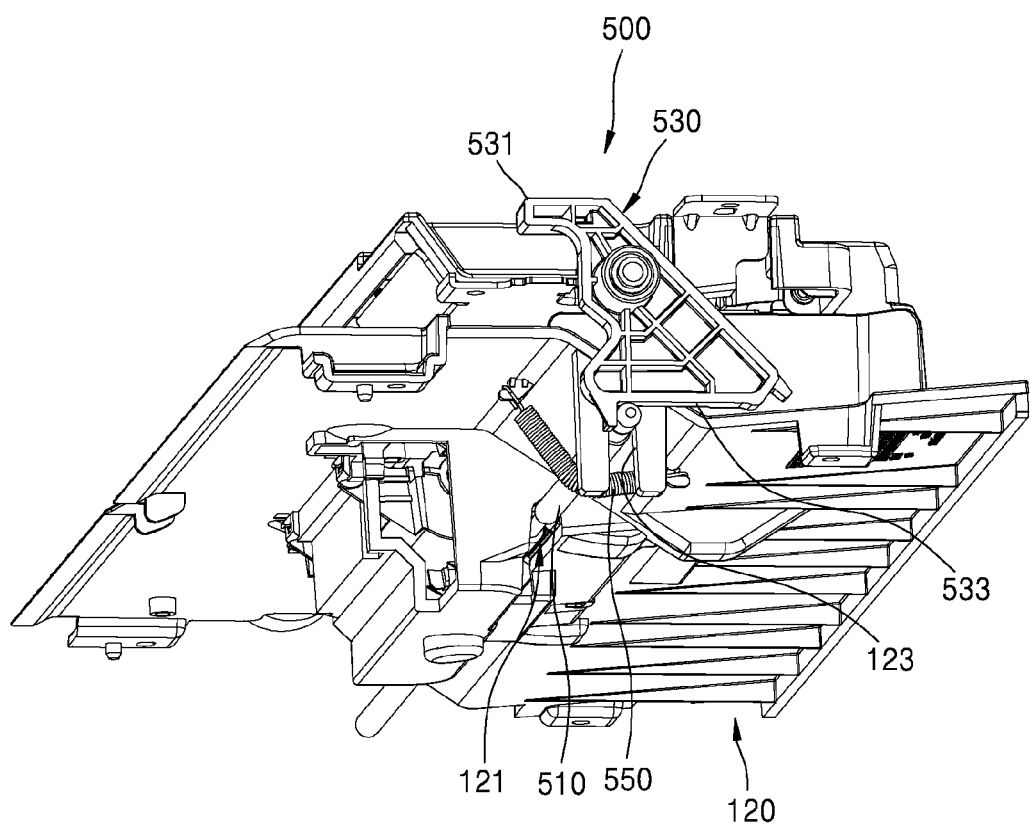
FIG. 6 is a perspective view of in exemplary central frame illustrating a positional relationship between the position-changing module and the central frame.

FIG. 6 is a perspective exemplary view of the central frame 120 of FIG. 5A seen from the bottom, illustrating a positional relationship between the position-changing module 500 and the central frame 120 of FIG. 5A.

Referring to FIGS. 5A and 6, the pressure rod 510 may be disposed to pass through the guide portion 123 of the central frame 120. While the pressure rod 510 moves, the guide portion 123 guides the pressure rod 510 and thus the pressure rod 510 moves along the guide portion 123. For example, the pressure rod 510 may be guided to linearly move in a vertical direction.

Both end portions of the second elastic member 550 may be fixed to the central frame 120. A lateral portion of the second elastic member 550 contacts the pressure rod 510 and supports a weight of the pressure rod 510.

When the pressure rod 510 moves downward due to the pressure of the pressure lever 530, the second elastic member 550 that supports the weight of the pressure rod 510 may be lengthened. When the pressure of the pressure lever 530 is removed, the pressure rod 510 moves upward due to an elastic force of the second elastic member 550 and returns to its position before the pressure.

A state where the friction module 340 moves between the first position 340a and the second position 340b due to the position-changing module 500 constructed is disclosed.

Figure 7A:
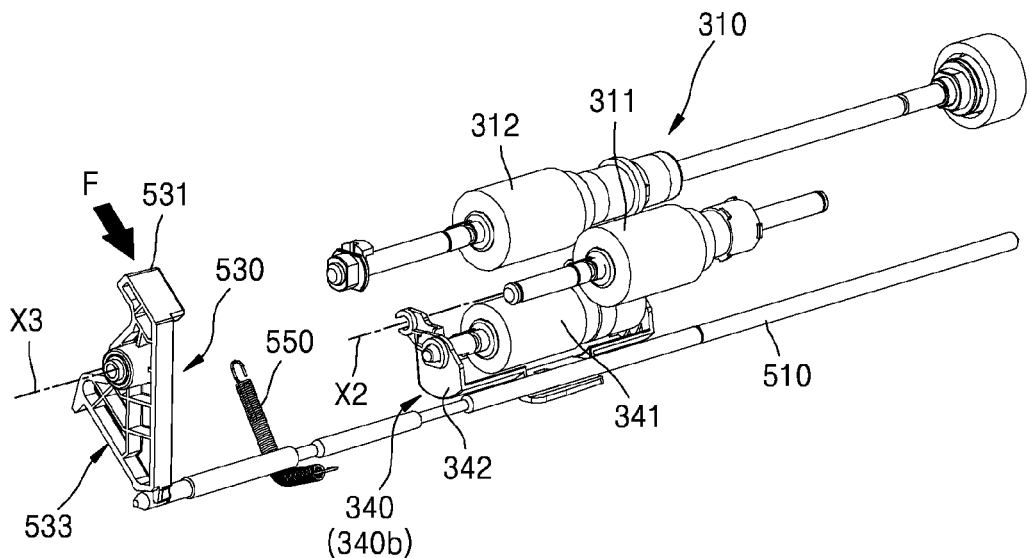
FIGS. 7A and 7B are perspective views illustrating an operation to change a position of the friction module by manipulating a pressure lever in in exemplary scanner device.
Figure 7B:
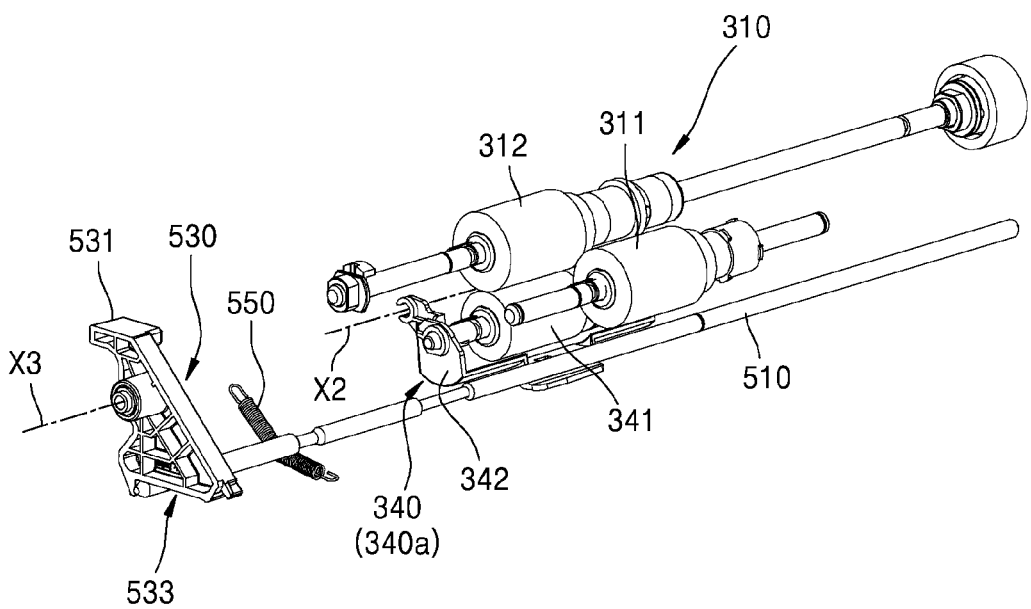
Figure 8A:
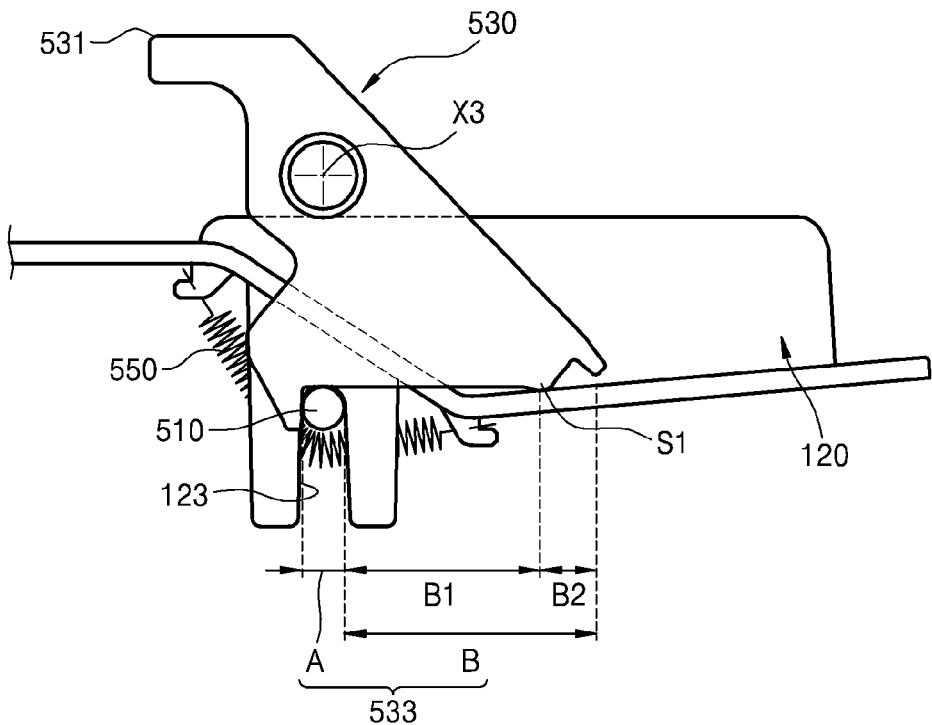
FIGS. 8A through 8C are cross-sectional views illustrating exemplary operations of a pressure lever and a pressure rod.
Figure 8B:
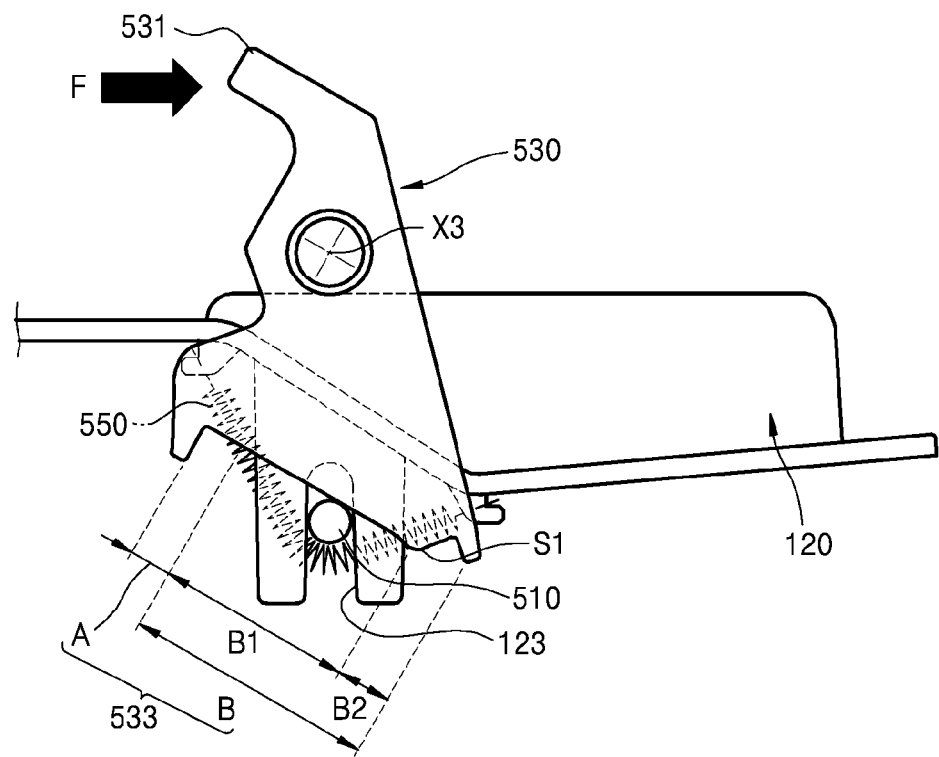
Figure 8C:
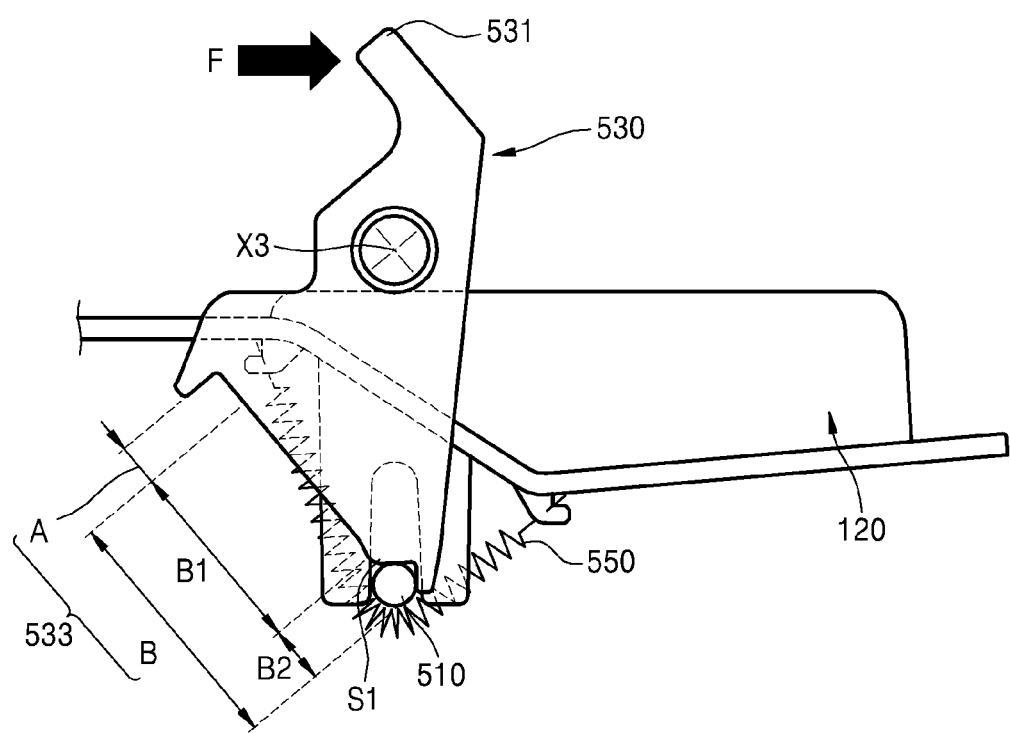

FIGS. 7A and 7B are perspective views illustrating an exemplary operation to change a position of the friction module 340 by manipulating the pressure lever 530 in the scanner device 1 of FIG. 5B. FIGS. 8A through 8C are cross-sectional views illustrating exemplary operations of the pressure lever 530 and the pressure rod 510 of FIG. 7A.

Referring to FIG. 7A, the user may press the manipulation part 531 of the pressure lever 530, for example, with a predetermined force F in an arrow direction to remove the document. Accordingly, the pressure lever 530 pivots about the pivotal axis X3. Due to the pressure of the pressure lever 530, the pressure rod 510 that contacts the pressure lever 530 moves, for example, downward. Due to the downward movement of the pressure rod 510, the holder 342 that supports the friction roller 341 pivots about the pivotal axis X2, and the friction roller 341 that is supported by the holder 342 may be separated from the forward roller 312. That is, the friction module 340 may be located at the second position 340b and the nip N that is formed between the forward roller 312 and the friction roller 341 is released. The user may easily remove the document that is stuck between the forward roller 312 and the friction roller 341 in a state where the nip N is released.

The contact part 533 of the pressure lever 530 includes a release section A and a pressure section B.

Referring to FIG. 8A, when the user does not manipulate the manipulation part 531 of the pressure lever 530, the pressure rod 510 contacts the release section A of the pressure lever 530. The pressure rod 510 does not contact the friction module 340, or even when the pressure rod 510 contacts the friction module 340, the nip N between the friction module 340 and the pickup module 310 may not be released.

Referring to FIGS. 8B and 8C, as the user presses the manipulation part 531 of the pressure lever 530 clockwise, the pressure rod 510 contacts the pressure section B of the pressure lever 530. When the pressure rod 510 contacts the pressure section B of the pressure lever 530, the pressure rod 510 may be pressed by the pressure lever 530. The friction roller 341 and the forward roller 312 are separated from each other and the nip N is released. The pressure section B includes a half locking section B1 and a locking section B2.

When the pressure rod 510 contacts the half locking section B1 of the contact part 533, as illustrated in FIG. 8B, the pressure rod 510 is pressed by the pressure lever 530 and moves downward. The friction roller 341 moves downward due to the pressure rod 510, and thus the nip N between the friction roller 340 and the forward roller 312 is released. In a state where the pressure rod 510 contacts the half locking section B1 of the contact part 533, when the user removes the pressure on the pressure lever 530, the pressure rod 510 moves upward due to the second elastic member 550 and the pressure of the pressure rod 510 on the holder 342 is removed. Accordingly, the friction roller 341 and the forward roller 312 contact each other and the nip N is formed.

When the pressure rod 510 contacts the locking section B2 of the contact part 533, as illustrated in FIG. 8C, the pressure rod 510 is pressed by the pressure lever 530 and thus the nip N between the friction roller 341 and the forward roller 312 is released. In a state where the pressure rod 510 contacts the locking section B2 of the contact part 533, when the user removes the pressure on the pressure lever 530, a movement of the pressure rod 510 may be limited by a stopper S1. Accordingly, the pressure of the pressure rod 510 on the holder 342 is maintained. The state where the nip N between the friction roller 341 and the forward roller 312 is released is maintained. That is, the state where the nip N is released may be maintained even when the user releases his/her hands off the pressure lever 530. Accordingly, when the pressure rod 510 contacts the locking section B2, the user may remove a paper jam, for example, with only one hand. To make the pressure lever 530 return to its position before the pressure was applied, the user may apply an external force to the manipulation part 531 counterclockwise opposite to a direction of the pressure.

According to an embodiment, the user may enable the pressure rod 510 to contact any one of the release section A, the half locking section B1, and the locking section B2 of the pressure lever 530 by varying the degree of pressure. For example, the user may press the pressure lever 530, for example, with one hand to enable the pressure rod 510 to contact the half locking section B1 and may remove the document with the other hand. Alternatively, the user may press the pressure lever 530 to enable the pressure rod 510 to contact the locking section B2, and may remove the document while releasing his/her hands off the pressure lever 530.

Referring to FIG. 7B, the user may cause the pressure lever 530 to return to its position before a pressure was applied, for example, by removing the pressure on the manipulation part 531 of the pressure lever 530 or by pressing the manipulation part 531 in a direction opposite to the direction of the pressure. The pressure rod 510 may return to its position before the pressure due to an elastic force of the second elastic member 550 and the holder 342 returns to its position before the pressure was applied due to the first elastic member 343, and thus the nip N is formed between the friction roller 341 and the forward roller 312. The pressure rod 510 contacts the release section A of the pressure lever 530.

However, an example where the pressure lever 530 returns to its position before a pressure was applied is not limited thereto, and the pressure lever 530 may return to its position before the pressure was applied in various other ways. For example, the pressure lever 530 may return to its position, before the pressure was applied, when the cover 150 is closed.

Figure 9:
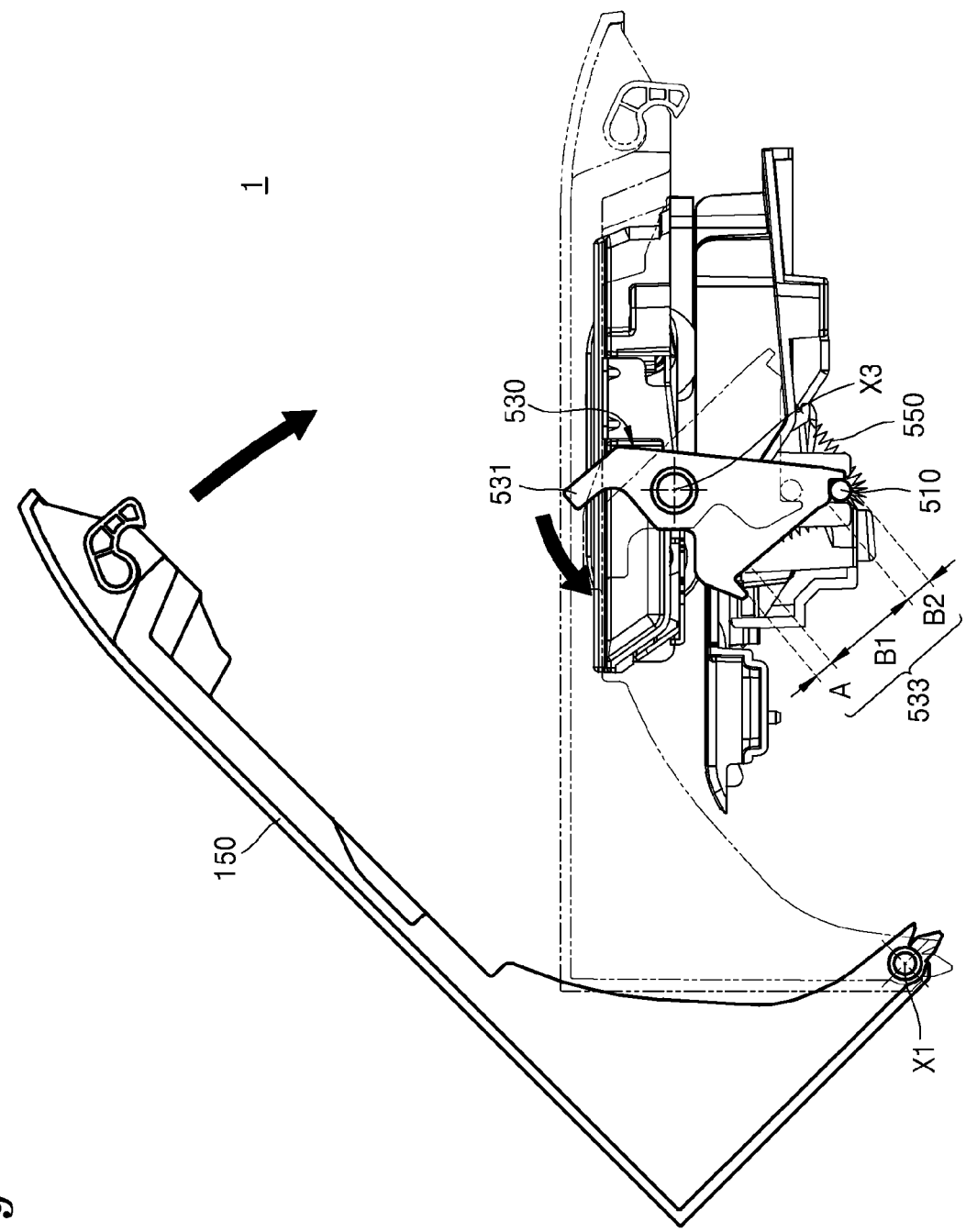
FIG. 9 is a view of an example where the pressure lever returns to its position before pressure when the cover is closed in a scanning device.

FIG. 9 is a view of an example where the pressure lever 530 returns to its position before the pressure was applied when the cover 150 is closed in the scanning device 1 of FIG. 5A. In FIG. 9, the pressure rod 510 is pressed due to the locking section B2 of the contact part 533 of the pressure lever 530, the nip N between the friction roller 341 and the forward roller 312 is released, and it may be impossible to normally feed the document.

Referring to FIG. 9, when the cover 150 is closed, cover 150 may contact the manipulation part 531 of the pressure lever 530, and may press the manipulation part 531 to move the manipulation part 531 to its position before the pressure was applied. Since the cover 150 contacts and presses the manipulation part 531 of the pressure lever 530, the cover 150 may enable the pressure lever 530 to pivot counterclockwise. Accordingly, the pressure lever 530 may return to its position before the pressure. The pressure rod 510 contacts the release section A, and the pressure of the pressure rod 510 on the friction module 340 is removed.

Figure 10A:
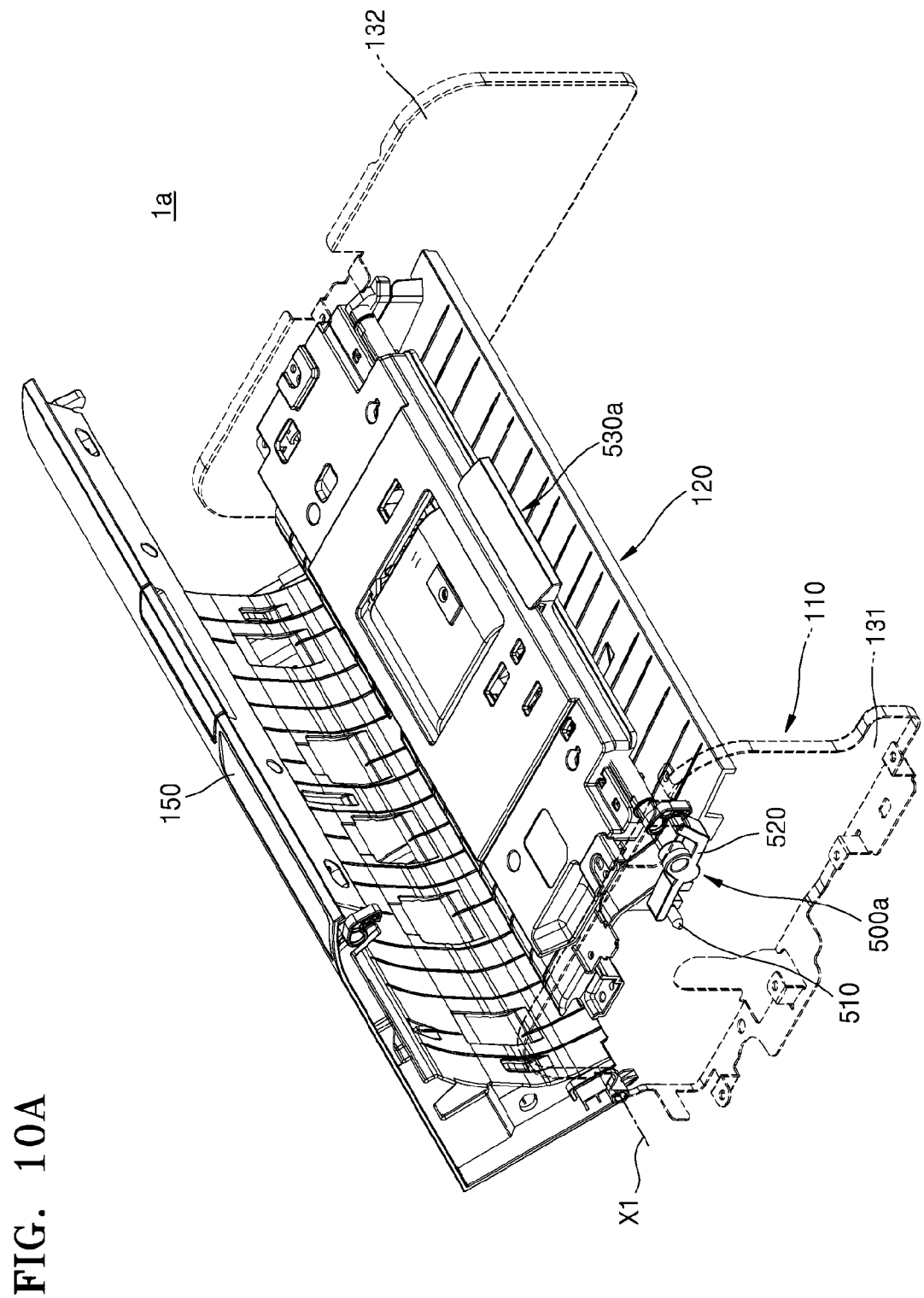
FIG. 10A is a perspective view of an assembled scanner device according to an embodiment.
Figure 10B:
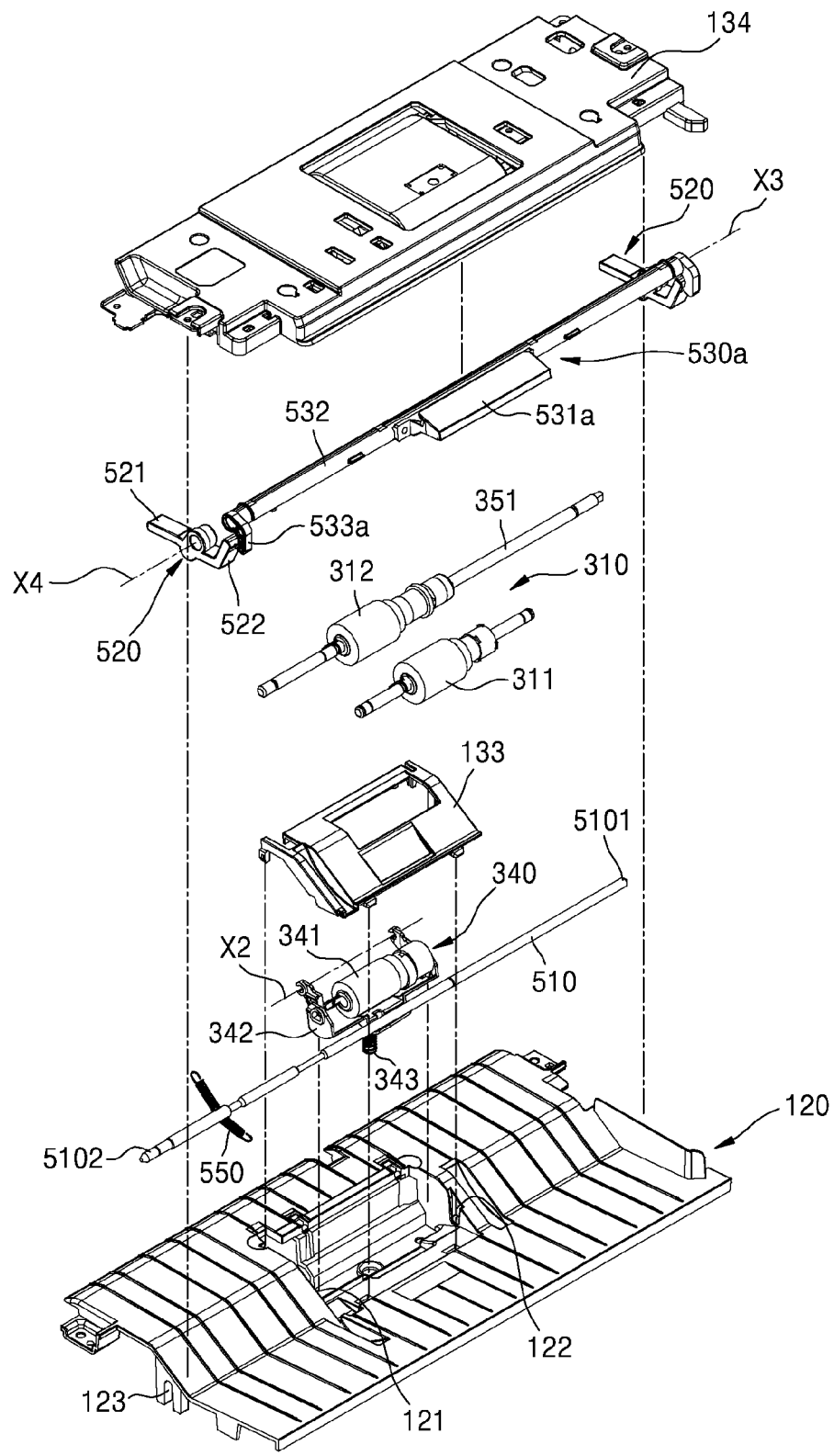
FIG. 10B is an exploded exemplary perspective view of a central frame, a pickup module, a friction module, and a position-changing module.

FIG. 10A is a perspective view of an assembled scanner device 1a according to an embodiment of the present invention. FIG. 10B is an exemplary exploded perspective view of the central frame 120, the pickup module 310, the friction module 340, and a position-changing module 500a of FIG. 10A. In FIGS. 10A and 10B, a part of the position-changing module 500 of FIG. 5B is modified in an exemplary manner, and the following explanation will focus on a difference between the position-changing module 500 and the position-changing module 500a. The similar elements as those illustrated in FIG. 5B will not be repeatedly explained.

Referring to FIGS. 10A and 10B, the position-changing module 500a includes the pressure rod 510, a connection link 520, a pressure lever 530a, and the second elastic member 550.

The pressure rod 510 may contact the holder 342. The pressure rod 510 extends in the width direction of the document, and a position of the pressure rod 510 may be changed. When the position of the pressure rod 510 is changed, the friction roller 341 that is supported by the holder 342 may be separated from the forward roller 312 by enabling the pressure rod 510 to contact and press the holder 342. At least one end portion, for example, the other end portion 5102, of the pressure rod 510 may contact the connection link 520.

The pressure lever 530a includes a manipulation part 531a for the user's manipulation, a contact part 533a that contacts the connection link 520, and a shaft 532 that connects the manipulation part 531a and the contact part 533a. The contact part 533a may be disposed outside the document feed path 300 not to interfere with the document feed path 300.

The connection link 520 may pivot, and contacts the pressure rod 510 and the pressure lever 530a. The connection link 520 includes a second contact part 521 that contacts the end portions 5101 and 5102 of the pressure rod 510 and a third contact part 522 that contacts the pressure lever 530a, and may pivot about a pivotal axis X4 formed between the second contact part 521 and the third contact part 522.

When the user opens the cover 150 and pulls out the pressure lever 530a, the pressure lever 530a pivots to press the third contact part 533a of the connection link 520. The connection link 520 pivots due to the pressed third contact part 522, and the second contact part 521 presses the pressure rod 510. Accordingly, the friction module 340 moves, and the nip N between the pickup module 310 and the friction module 340 is released.

The user causes the pressure lever 530a to return to its position before the pressure, by removing the pressure on the manipulation part 531a of the pressure lever 530a or by pressing the manipulation part 531a in a direction opposite to the direction of the pressure. The pressure rod 510 returns to its position before the pressure due to the second elastic member 550, the holder 342 returns to its position before the pressure due to the first elastic member 343, and the nip N is formed between the friction roller 341 and the forward roller 312.

An operation to change a position of the friction module 340 between the first position 340a and the second position 340b by using the position-changing module 500a is explained.

Figure 11A:
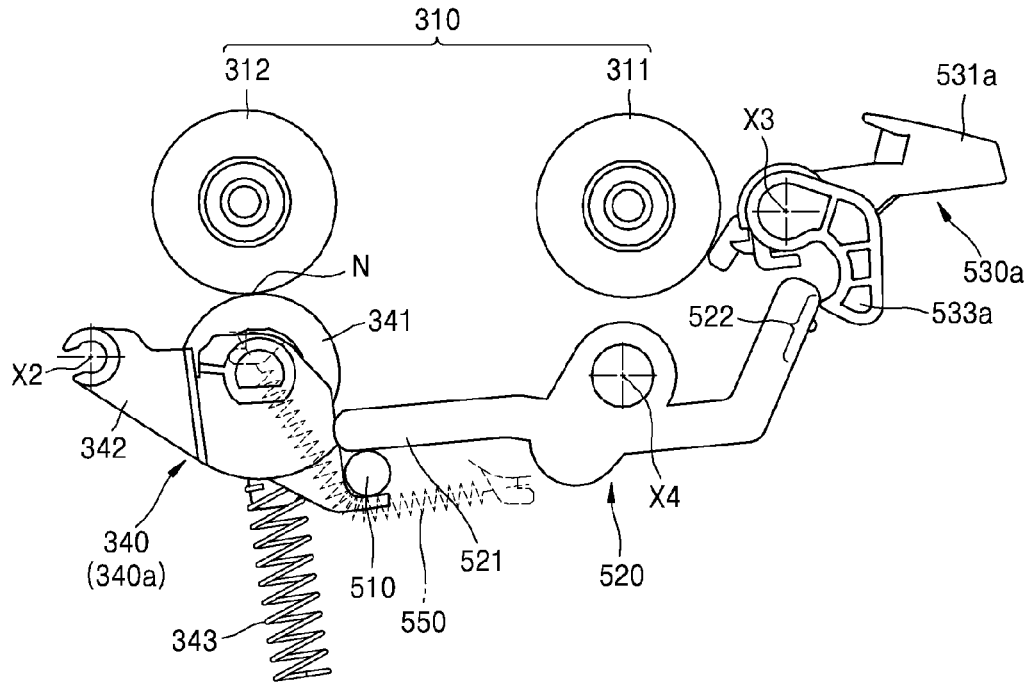
FIGS. 11A and 11B are perspective views illustrating an exemplary operation to change a position of the friction module by manipulating the pressure lever in the scanner device.
Figure 11B:
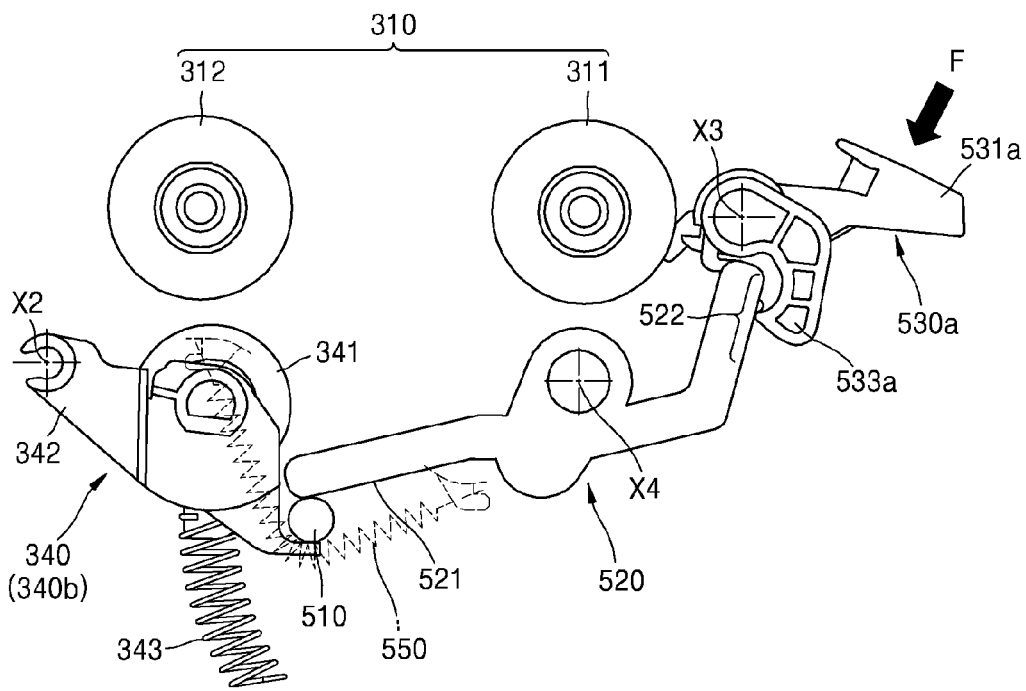

FIGS. 11A and 11B are perspective views illustrating an exemplary operation to change a position of the friction module 340 by manipulating the pressure lever 530a in the scanner device 1a of FIG. 10B.

Referring to FIG. 11A, when the user does not apply a force to the pressure lever 530a, that is, when the pressure lever 530a is located at a position before being pressed, the forward roller 312 and the friction roller 341 form the nip N therebetween.

Referring to FIG. 11B, the user presses the manipulation part 531a of the pressure lever 530a with a predetermined force F in an arrow direction. Accordingly, the pressure lever 530a pivots about the pivotal axis X3 clockwise. The contact part 533a of the pressure lever 530a presses the third contact part 522 of the connection link 520. The connection link 520 pivots counterclockwise, and the second contact part 521 presses the pressure rod 510. The pressure rod 510 moves downward due to the pivoting of the connection link 520. Due to the downward movement of the pressure rod 510, the holder 342 that supports the friction roller 341 pivots about the pivotal axis X2 and moves downward. Accordingly, the nip N that is formed between the friction roller 341 and the forward roller 312 is released. The user may easily remove the document that is stuck between the forward roller 312 and the friction roller 341 between which the N is released.

The user causes the pressure lever 530a to return to its position before the pressure by removing the pressure on the manipulation part 531a of the pressure lever 530a or by pressing the manipulation part 531a in a direction opposite to the direction of the pressure. The pressure rod 510 returns to its position before the pressure due to the second elastic member 550, the holder 342 returns to its position before the pressure due to the first elastic member 343, and the nip N is formed between the friction roller 341 and the forward roller 312.

Figure 12:
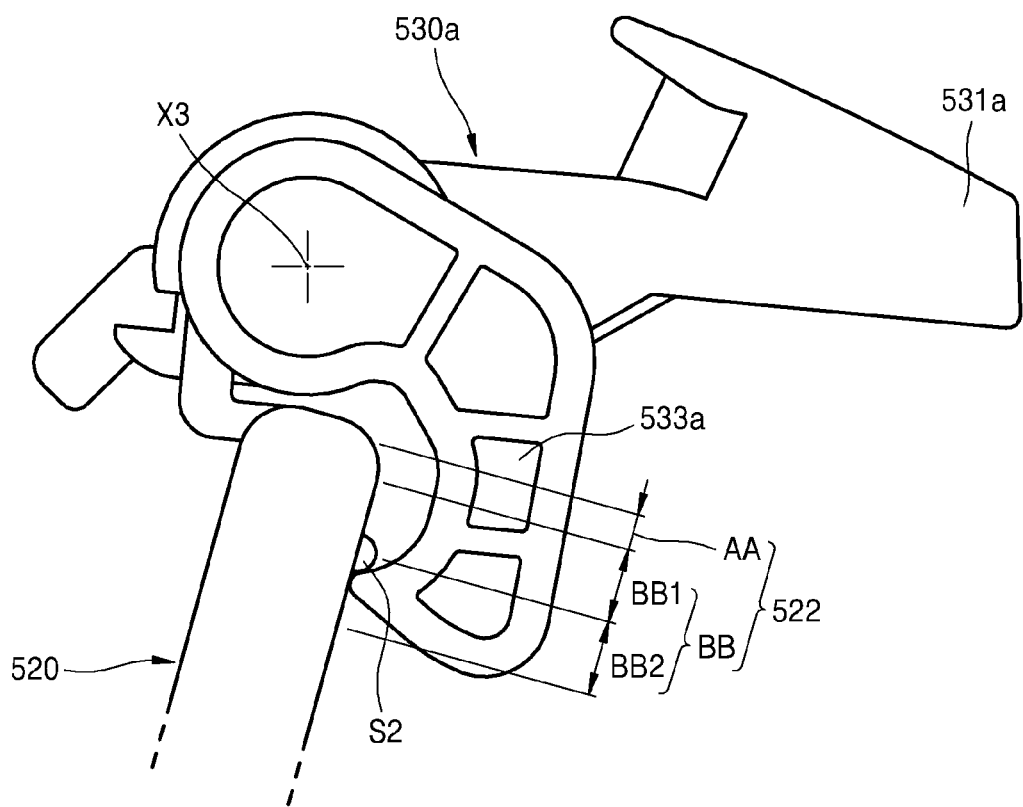
FIG. 12 is an enlarged exemplary cross-sectional view of a part of a pressure lever and a connection link.

FIG. 12 illustrates an exemplary part of the connection link 520 and the pressure lever 530a of FIG. 11B. The third contact part 522 that contacts the pressure lever 530a of the connection link 520 may include a second release section AA and a second pressure section BB.

When the user does not manipulate the manipulation part 531a of the pressure lever 530a, the pressure lever 530a contacts the second release section AA of the connection link 520. The pressure rod 510 does not contact the friction module 340. Even when the pressure rod 510 contacts the friction module 340, the nip N between the friction module 340 and the pickup module 310 is not released.

As the user presses the manipulation part 531a of the pressure lever 530a clockwise, the contact part 533a of the pressure lever 530a contacts the second pressure section BB of the third contact part 522. When the contact part 533a of the pressure lever 530a contacts the second pressure section BB, the connection link 520 presses the pressure rod 510 and the pressure rod 510 presses the friction module 340.

The second pressure section BB includes a second half locking section BB1 and a second locking section BB2. When the contact part 533a of the pressure lever 530a contacts the second half locking section BB1 of the connection link 520, the user may press the manipulation part 531a of the pressure lever 530a with one hand and may remove the document with the other hand. When the user removes the pressure on the manipulation part 531a of the pressure lever 530a, the pressure rod 510 moves upward due to the second elastic member 550 and the connection link 520 pivots clockwise. Accordingly, the pressure of the pressure rod 510 on the holder 342 is removed, the friction roller 341 and the forward roller 312 contact each other, and the nip N is formed.

When the contact part 533a of the pressure lever 530a contacts the second locking section BB2 of the connection link 520, that is, when the user removes the pressure on the manipulation part 531a of the pressure lever 530a, a movement of the pressure lever 530a is limited by a stopper S2. The pressure of the connection link 520 on the pressure rod 510 is maintained, and the pressure of the pressure rod 510 on the holder 342 is maintained. Accordingly, the state where the nip N between the friction roller 341 and the forward roller 312 is released is maintained. That is, the state where the nip N is released may be maintained even when the user releases his/her hands off the pressure lever 530a. Accordingly, when the pressure lever 530a contacts the second locking section BB2, the user may remove a paper jam, for example, with only one hand. In order to make the pressure lever 530a return to its position before the pressure, the user may apply, for example, an external force to the manipulation part 531a in a direction opposite to the direction of the pressure.

Figure 13:
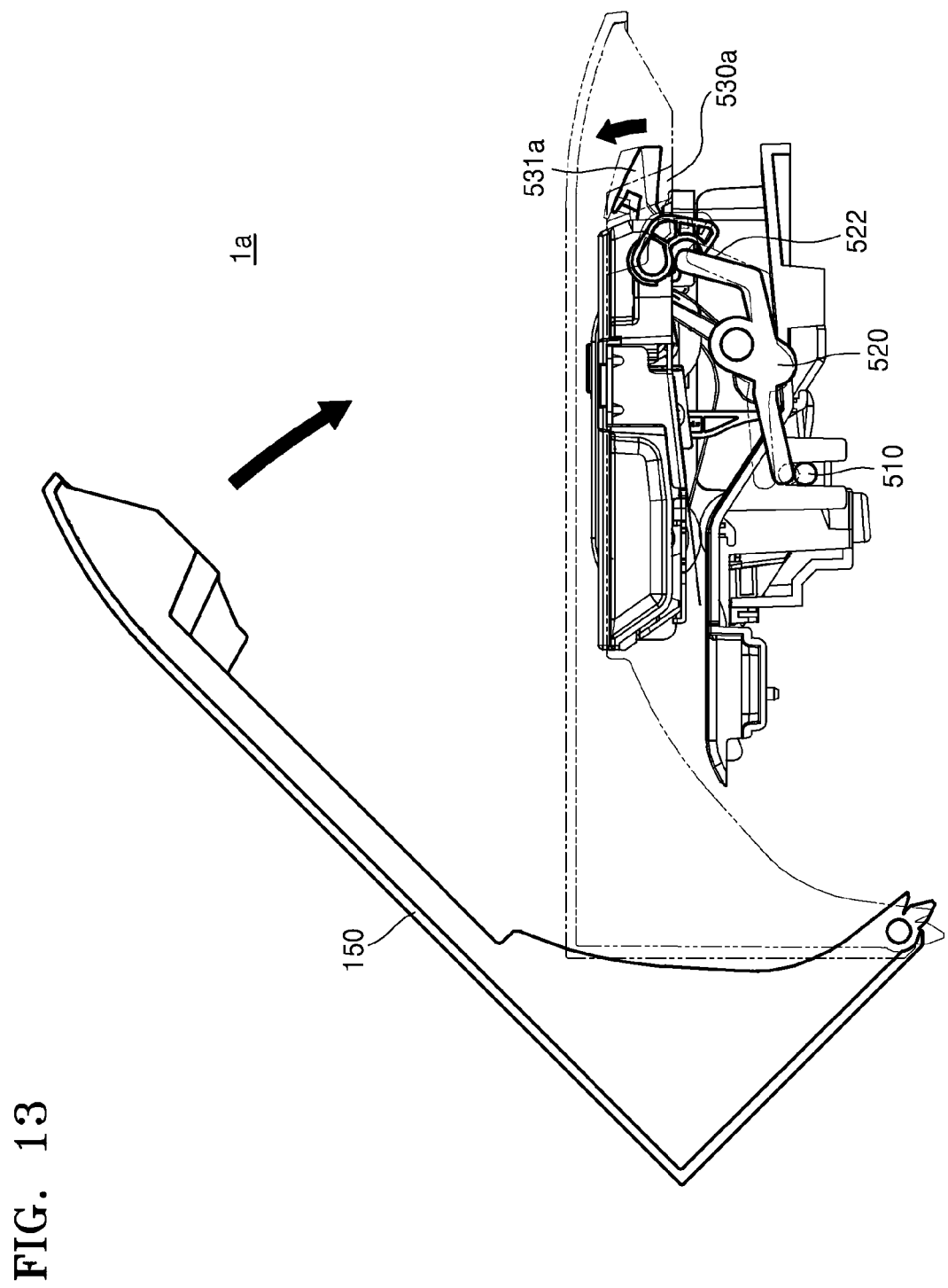
FIG. 13 is a view of an example where the pressure lever returns to its position before pressure when the cover is closed in the scanning device.

An example where the pressure lever 530a returns to its position before pressure is not limited and various modifications may be made. For example, the user may cause the pressure lever 530a to return to its position before the pressure was applied by removing the pressure on the pressure lever 530a or by pressing the manipulation part 531a of the pressure lever 530a counterclockwise. Alternatively, when the cover 150 is closed, the user may cause the pressure cover 530a to return to its position before a pressure was applied. For example, as illustrated in FIG. 13, the cover 150 may press the manipulation part 531a of the pressure lever 530a when the cover 150 is closed. The pressure lever 530a and/or the cover 150 may be designed such that at least a part of the pressure lever 530a interferes with a movement path of the cover 150. Even when the user does not cause the pressure lever 530a to return to its position before pressure, the pressure lever 530a may return to its position before the pressure when the user closes the cover 150.

Figure 14A:
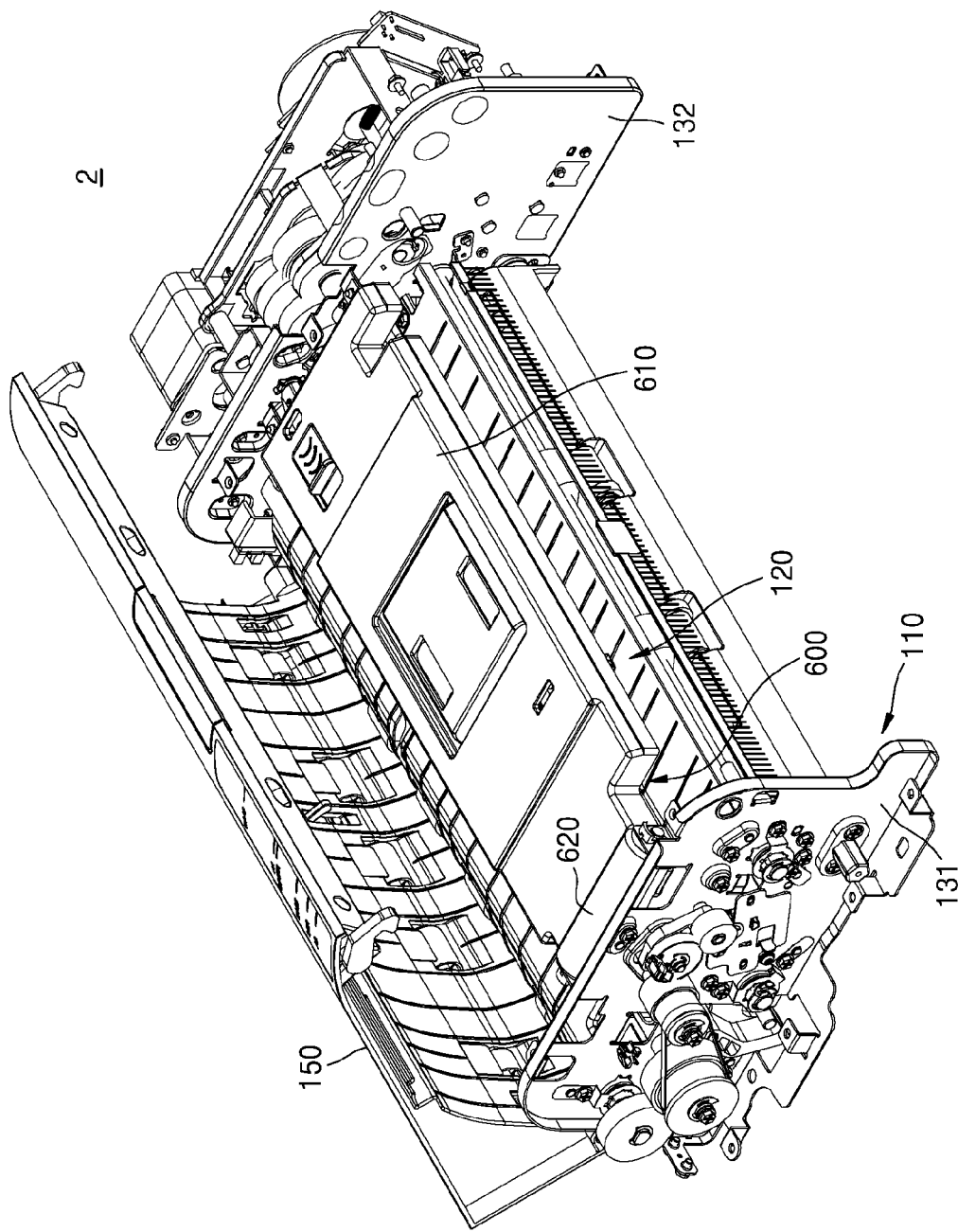
FIG. 14A is a perspective view of an assembled scanner device according to an embodiment.
Figure 14B:
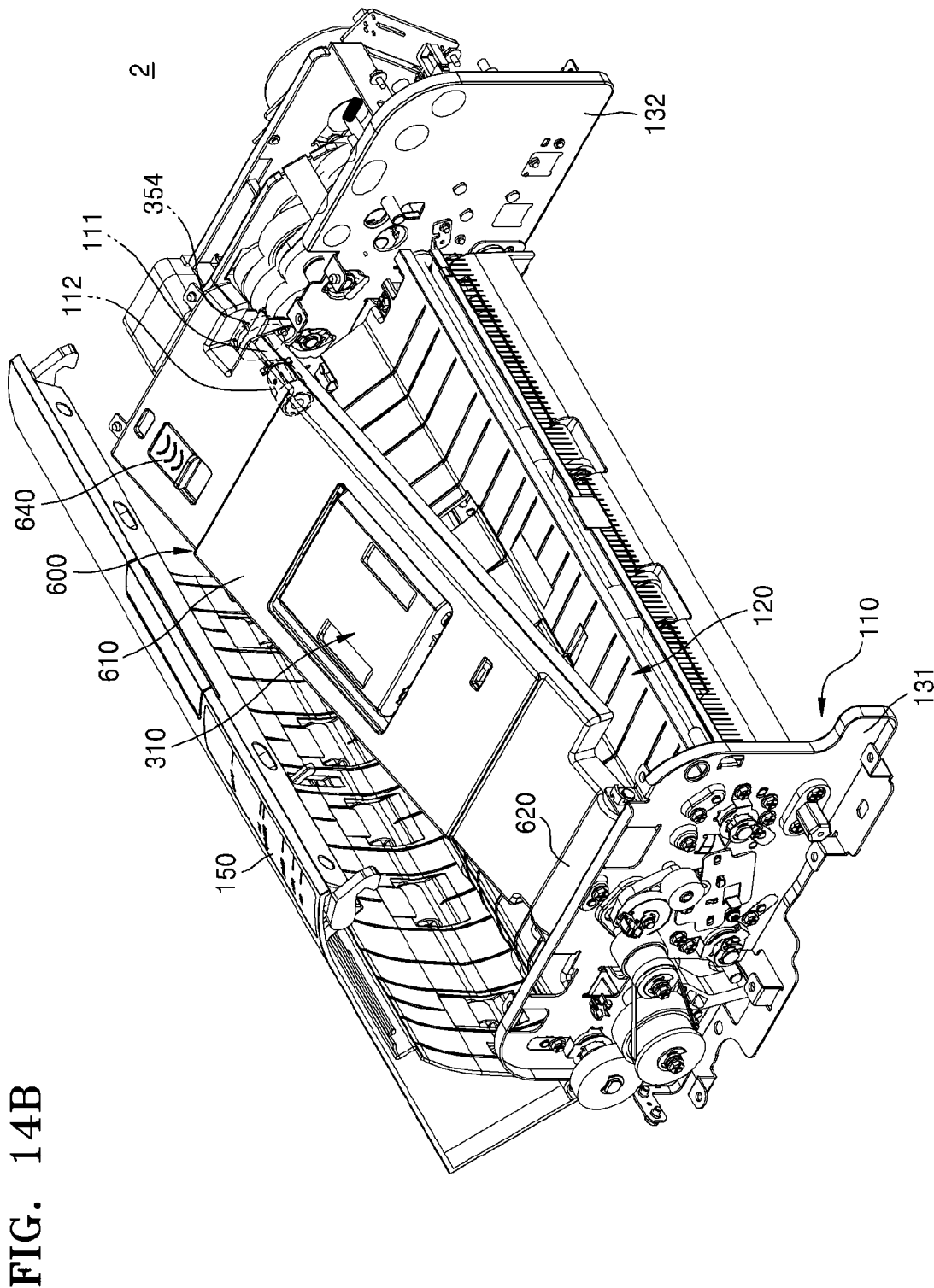
Figure 15:
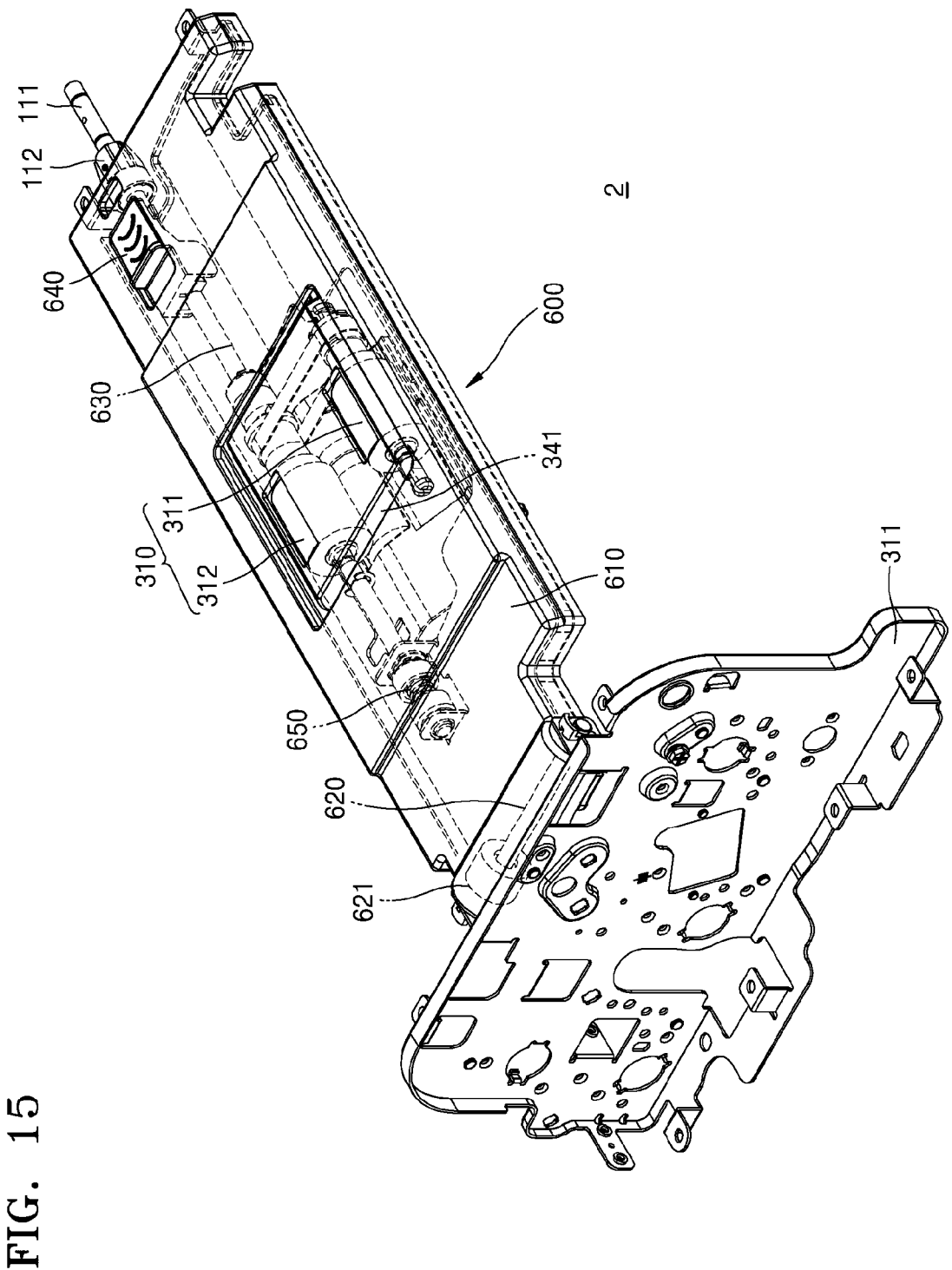
FIG. 15 is a perspective view of an exemplary position-changing module.

FIG. 14A is a perspective view of an assembled scanner device 2 according to an embodiment of the present invention. FIG. 14B is an exploded exemplary perspective view of the scanner device 2 of FIG. 14A. FIG. 15 is a perspective view of a position-changing module 600 of FIG. 14A. According to an exemplary embodiment, the position-changing module 500a of FIG. 5B may be partially modified. The following explanation discloses an exemplary difference between the position-changing module 500a and the position-changing module 600.

The position-changing module 600 may manually move the pickup module 310 from the third position 310a where the pickup module 310 contacts the friction module 340 to the fourth position 310b where the pickup module 310 is separated from the friction module 340, see, for example, FIGS. 4A and 4B.

Referring to FIGS. 14A, 14B, and 15, the position-changing module 600 includes a movable frame 610 on which the pickup module 310 may be mounted. A pivot shaft 620 that is disposed in a direction parallel to the document feed direction may be provided on one end portion of the movable frame 610. The movable frame 610 may pivot about the pivot shaft 620. The pickup module 310 that is mounted on the movable frame 610 may be separated from the friction module 340 by allowing the pivoting frame 610 to pivot.

A driving unit 111 that applies a driving force to the pickup module 310 that is mounted on the movable frame 610 may be disposed on the lateral frame 132 of the base frame 110. The driving gear 354 may be connected to the driving unit 111. A connection holder 112 for connection with a support shaft 630 may be provided on the driving unit 111. A one-way bearing (not illustrated) may be disposed on the connection holder 112 such that the support shaft 630 may rotate in one direction.

The movable frame 610 further includes the support shaft 630 that is connected to the driving unit 111 that is disposed on the base frame 110 and a movable lever 640 that moves the support shaft 630 away from the driving unit 111.

The pickup module 310 is supported by the support shaft 630. When the support shaft 630 is connected to the driving unit 111, the support shaft 630 may transfer a driving force of the driving unit 111 to the forward roller 312 to rotate the forward roller 312. The support shaft 630 may move in the width direction of the document. The width direction of the document may be perpendicular to the document feed direction.

The movable lever 640 may move in the width direction of the document and may contact the support shaft 630. The user may move the support shaft 630 that contacts the movable lever 640 by moving the movable lever 640 away from the driving unit 111, for example, leftward. Accordingly, a connection between the support shaft 630 and the connection holder 112 may be removed.

In a state where the connection between the support shaft 630 and the connection holder 112 is removed, the user may manually pivot the movable frame 610 by a predetermined angle about the pivot shaft 620. Accordingly, the friction module 340 and the pickup module 310 that is mounted on the movable frame 610 may be separated from each other, and the nip N is released.

Figure 16A:
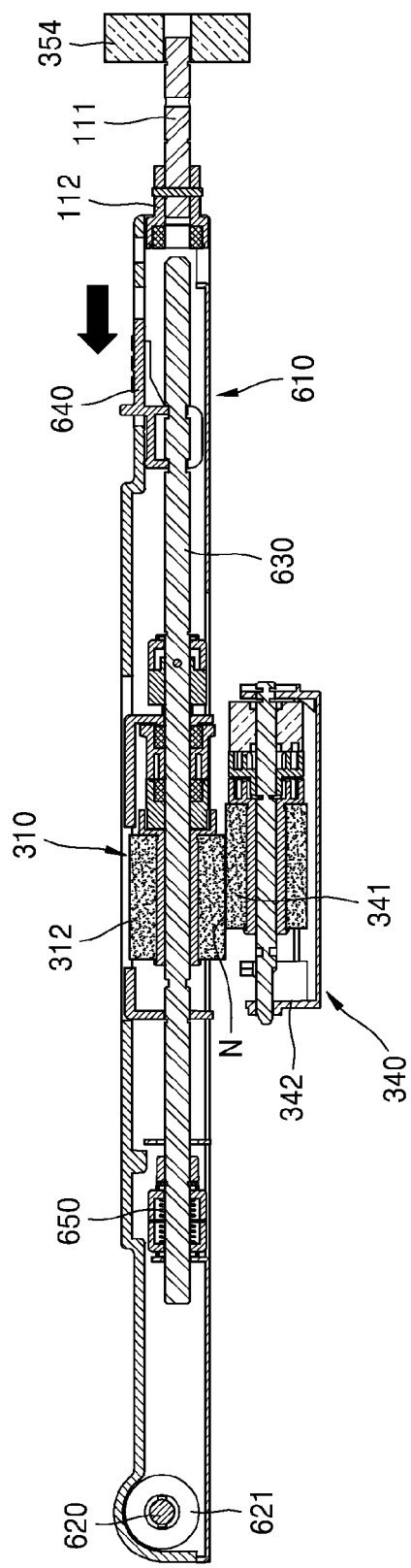
FIGS. 16A and 16B are cross-sectional views illustrating an exemplary operation of the position-changing module.
Figure 16B:
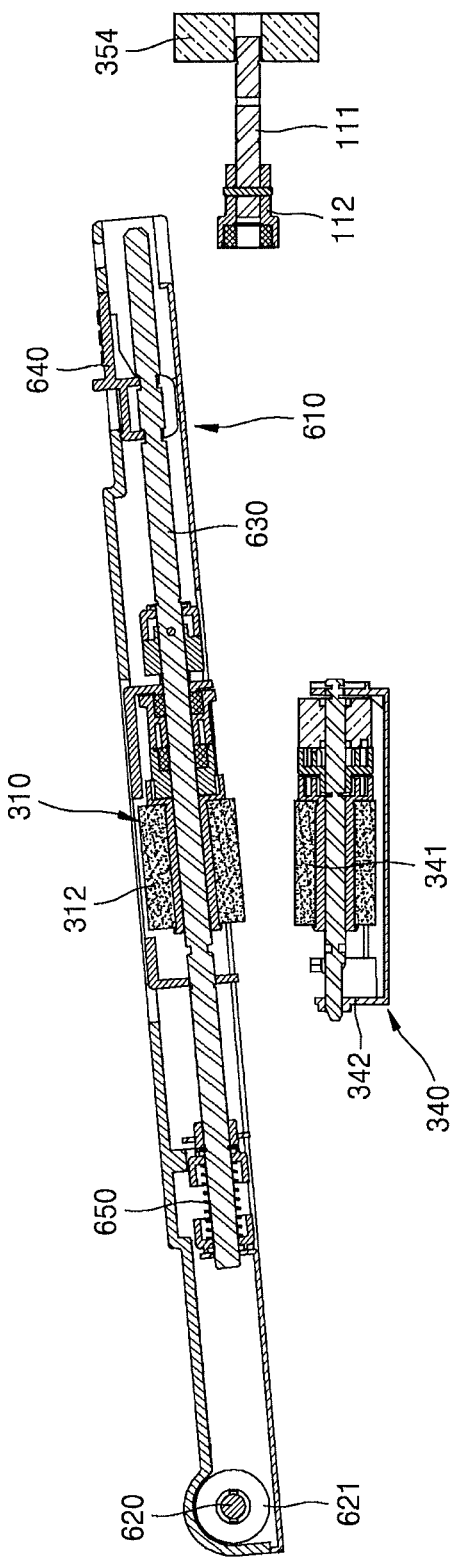

FIGS. 16A and 16B are cross-sectional views illustrating an operation of the position-changing module 600 of FIG. 15. Referring to FIG. 16A, the user presses the movable lever 640 leftward. As the user presses the movable lever 640, the support shaft 630 that is connected to the movable lever 640 moves, for example, leftward. An end portion of the support shaft 630 is separated from the connection holder 112. Accordingly, coupling between the support shaft 630 and the connection holder 112 may be removed, and the user may lift up the movable frame 610. The end portion of the support shaft 630 may have a round shape. Accordingly, the support shaft 630 and the connection holder 112 may be easily connected to each other and easily separated from each other.

Referring to FIG. 16B, as the movable frame 610 is lifted up, the movable frame 610 pivots about the pivot shaft 620 that is provided on the end portion of the movable frame 610. The forward roller 312 of the pickup module 310 is separated from the friction roller 341 of the friction module 340. Accordingly, the nip N between the pickup module 310 and the friction module 340 is released.

A torque limiter 621 may be provided on the pivot shaft 620 to fix a position of the movable frame 610. Only when a force greater than a force that is applied to the pivot shaft 620 due to a weight of the movable frame 610 is applied to the torque limiter 621, the torque limiter 621 may transfer the force to the pivot shaft 620. Accordingly, even when the user lifts up the movable frame 610 and lets the movable frame 610 free, the movable frame 610 may be prevented from falling down due to the weight of the movable frame 610.

After a paper jam is removed, the user may lower the movable frame 610 and the support shaft 630 may be re-connected to the driving unit 111 through the connection holder 112. The movable frame 610 may include a third elastic member 650 that, when the pressure on the movable lever 640 is removed, applies an elastic force to the support shaft 630 so that the support shaft 630 moves toward the driving unit 111.

Figure 17:
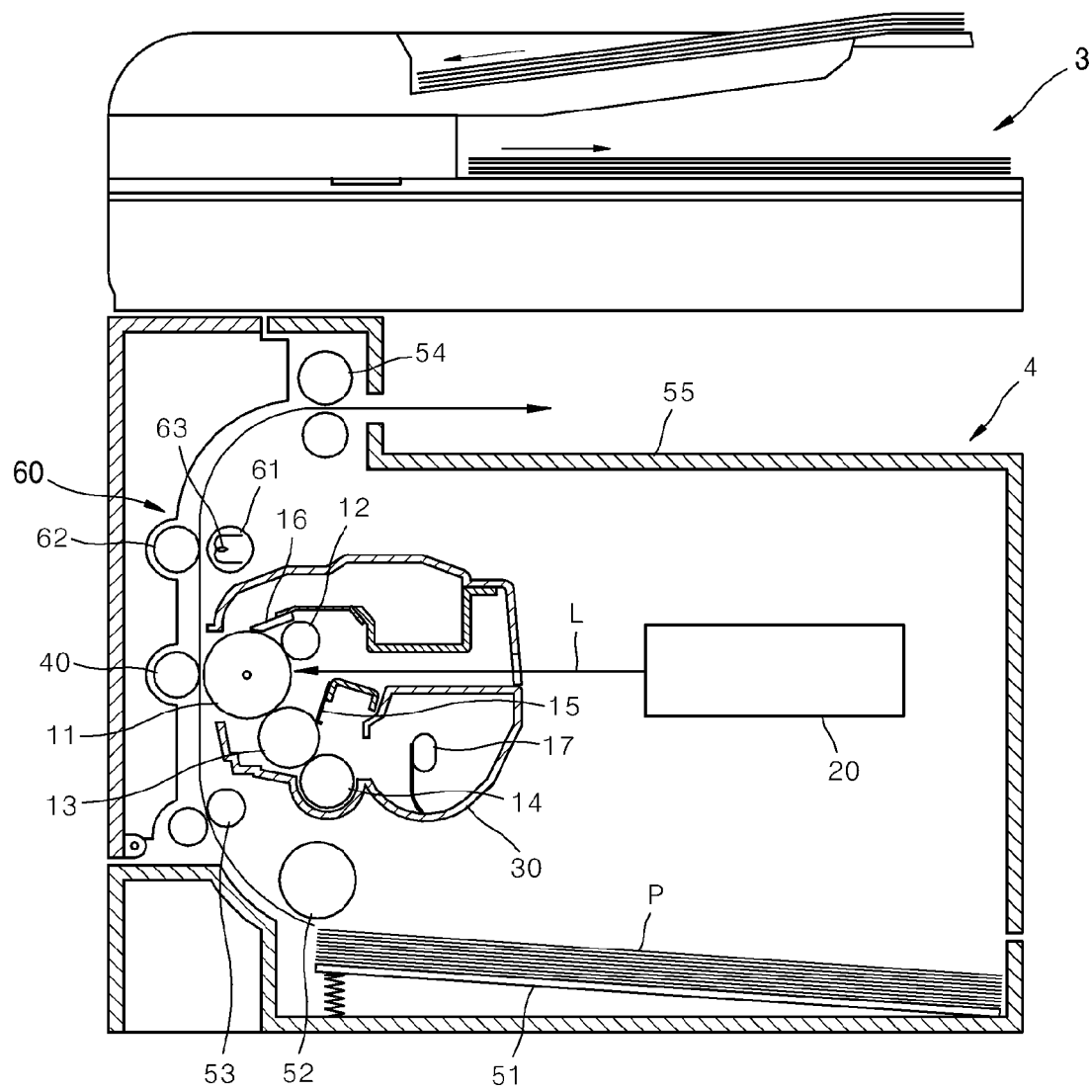
FIG. 17 is a cross-sectional view of an image forming apparatus according to an embodiment.

FIG. 17 is a cross-sectional view of an image forming apparatus according to an embodiment of the present invention. Referring to FIG. 17, a scanner device 3 and a printing unit 4 are illustrated. The printing unit 4 of FIG. 17 is an electrophotographic printing unit that prints an image on a sheet of paper by using electrophotography. The scanner device 3 may be located over the printing unit 4. The scanner device 3 may be, for example, the scanner device 1 of FIG. 4A, the scanner device 1*a* of FIG. 10A, or the scanner device 2 of FIG. 14A. The printing unit 4 is described.

A photosensitive drum 11, a charge roller 12, an exposure unit 20, a developing unit 30, and a transfer roller 40 are illustrated. The photosensitive drum 11 that is a photosensitive body on which an electrostatic latent image is formed may be formed by, for example, forming a photosensitive layer having photoconductivity on an outer circumferential surface of a cylindrical metal pipe. The charge roller 12 is a charge unit that charges a surface of the photosensitive drum 11 to a uniform potential. A charge bias voltage may be applied to the charge roller 12. A corona charge unit (not illustrated) instead of the charge roller 12 may be used.

The exposure unit 20 forms an electrostatic latent image by scanning light L that is modulated according to image information to the surface of the photosensitive drum 11 that is charged to the uniform potential. For example, a laser scanning unit (LSU) that deflects light emitted from a laser diode in a main scan direction by using a polygon mirror and scans the deflected light to the photosensitive drum 11 may be used as the exposure unit 20.

The developing unit 30 supplies toner to the electrostatic latent image that is formed on the photosensitive drum 11 and develops the toner. A developing roller 13 supplies the toner to the electrostatic latent image that is formed on the surface of the photosensitive drum 11 and develops the toner into a visible toner image. A non-contact development method may be, and a surface of the developing roller 13 may be spaced apart from the surface of the photosensitive drum 11 by an interval of in an order of approximately hundreds of microns. This interval may be referred to as a developing gap. When a developing bias voltage is applied to the developing roller 13, the toner may be moved to the electrostatic latent image that is formed on the surface of the photosensitive drum 11 through the developing gap and is attached to the electrostatic latent image. When a contact development method is used, the developing roller 13 contacts the photosensitive drum 11. A supply roller 14 for attaching the toner to the developing roller 13 may be further provided in the developing unit 30. A supply bias voltage may be applied to the supply roller 14 to attach the toner to the developing roller 13. A restriction member 15 may restrict the amount of toner that is attached to the surface of the developing roller 13. The restriction member 15 may be a restriction blade having a front end that contacts the developing roller 13 at a predetermined pressure. A cleaning member 16 may remove residual toner and a foreign material from the surface of the photosensitive drum 11 before charging. The cleaning member 16 may be a cleaning blade having a front end that contacts the surface of the photosensitive drum 11. An agitator 17 feeds the toner to the developing roller 13. The agitator 17 may agitate the toner and charge the toner to a predetermined potential.

The transfer roller 40 is a transfer unit that may be located to face the surface of the photosensitive drum 11 and forms a transfer nip N. A transfer bias voltage for transferring to a recording medium P the toner image that is developed on the surface of the photosensitive drum 11 is applied to the transfer roller 40. A corona transfer unit instead of the transfer roller 40 may be used.

The recording medium P, on which an image is to be printed, is withdrawn from a paper cassette 51 by a pickup roller 52. The withdrawn recording medium P may be supplied by a feeding roller 53 to an area where the transfer roller 40 and the photosensitive drum 11 face each other. The toner image on the photosensitive drum 11 may be transferred to a surface of the recording medium P due to the transfer bias voltage that is applied to the transfer roller 40 and is maintained on the surface of the recording medium P due to an electrostatic force.

A fixing unit 60 forms a permanent print image on the recording medium P by applying heat and pressure to the toner image and fixing the toner image onto the recording medium P. The fixing unit 50 may form a fixing nip when a heating roller 61 in which a heating unit 63 is buried and a pressure roller 62 engage with each other. The recording medium P that has passed through the fixing unit 60 is discharged by a discharge roller 54 to a discharge tray 55.

The image forming apparatus may perform printing, copying, and readout. The printing refers to an operation of printing an image on a sheet of paper based on image information output from an external host (not illustrated). The copying refers to an operation of printing an image on a sheet of paper by reading image information from a document by using the scanner device 3 and transferring the image information to the printing unit 4. The readout refers to an operation of reading image information from a document and, for example, transferring the read image information to a host (not illustrated). When a communication unit is provided, the image forming apparatus may perform a fax transmission function to transmit read image information by using a communication line such as a telephone line and may perform a fax reception function to print the received image information by using the printing unit 4.

Although the printing unit 4 is an exemplary printing unit using monochrome electrophotography and including one developing unit 30 in FIG. 17, an exemplary embodiment is not limited thereto. When the printing unit 4 is a printing unit using color electrophotography, four developing units 30, in which, for example, cyan (C), magenta (M), yellow (Y), and black (B) toners are received, may be used. The printing unit 4 may use any of other image forming methods such as inkjet or thermal transfer.

A scanner device and an image forming apparatus including the same according to the one or more embodiments of the present invention may not release a nip that is formed between a pickup module and a friction module even when a user opens a cover and may release the nip only when the user intentionally performs an additional operation. Accordingly, a paper jam may be easily removed and the nip may be prevented from being unnecessarily released.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A scanning device comprising:
   a base frame that comprises a supply tray on which a document is loadable to be scanned by the scanning device;
   a pickup unit on the base frame of the scanning device and configured to pick up the document loaded on the supply tray, and to feed the picked-up document;
   a friction unit on the base frame of the scanning device disposed to face the pickup unit to form a nip with the pickup unit, and configured to apply a frictional force to a rear surface of the document that is passing through the nip;
   a readout unit configured to read out an image from a side of the document that has passed through the nip;
   a cover that is pivotably provided on the base frame of the scanning device and configured to open at least a part of a document feed path without releasing the formed nip; and
   a position-changing unit on the base frame of the scanning device and configured to change a position of at least one selected from the pickup unit and the friction unit to release the formed nip after the cover opens the at least a part of a document feed path.

2. The scanning device of claim 1, wherein the friction unit is movable between a first position where the friction unit contacts the pickup unit to maintain the nip and a second position where the friction unit is separated from the pickup unit to release the nip, and
   the position-changing unit is configured to manually move the friction unit from the first position to the second position.

3. The scanning device of claim 2, wherein the position-changing unit comprises:
   a pressure rod that is contactable with the friction unit and presses the friction unit to move the friction unit from the first position to the second position; and
   a pressure lever that comprises a manipulation part for a user's manipulation and presses the pressure rod in order for the pressure rod to press the friction unit when an external force is applied to the manipulation part.

4. The scanning device of claim 3, wherein the position-changing unit further comprises an elastic unit that, when the pressure of the pressure rod on the friction unit is removed, applies an elastic force to the pressure rod in order for the pressure rod to return to its position before the pressure.

5. The scanning device of claim 4, wherein the pressure lever comprises a contact part that contacts an end portion of the pressure rod in a longitudinal direction of the pressure rod.

6. The scanning device of claim 5, wherein the contact part comprises a pressure section that, when the friction unit is located at the second position, presses the pressure rod,
   wherein the pressure section comprises a locking section that prevents a position of the pressure rod from being changed and a half locking section that allows the position of the pressure rod to be changed.

7. The scanning device of claim 4, wherein when the cover is closed, the pressure lever contacts the cover and pivots to remove the pressure on the pressure rod.

8. The scanning device of claim 1, wherein the pickup unit comprises a third position where the pickup unit contacts the friction unit to maintain the nip and a fourth position where the pickup unit is separated from the friction unit to release the nip, wherein the position-changing unit is configured to manually move the pickup unit between the third position and the fourth position.

9. The scanning device of claim 8, wherein the position-changing unit comprises a movable frame on which the pickup unit is mounted and that is pivotable about a pivot shaft that is provided on one end portion of the movable frame and is disposed in a direction parallel to the document feed direction.

10. The scanning device of claim 9, wherein the movable frame comprises:
   a support shaft that supports the pickup unit and is connected to a driving unit that is disposed on the base frame; and
   a movable lever that moves the support shaft away from the driving unit to remove the connection between the support shaft and the driving unit.

11. The scanning device of claim 10, wherein the movable frame further comprises a torque limiter that is provided on the pivot shaft to maintain the pickup unit at the fourth position.

12. The scanning device of claim 10, wherein the movable frame further comprises an elastic unit that applies an elastic force to the support shaft in order for the support shaft to move toward the driving unit.

13. A scanning device comprising:
   a base frame that comprises a supply tray on which a document is loadable to be scanned by the scanning device;
   a pickup unit that is provided on the base frame and configured to pick up the document loaded on the supply tray, and to feed the picked-up document;
   a friction unit that is provided on the base frame, is disposed to face the pickup unit to form a nip with the pickup unit, and configured to apply a frictional force to a rear surface of the document that is passing through the nip;
   a readout unit configured to read out an image from the document that has passed through the nip;
   a cover that is pivotably provided on the base frame and configured to open or close at least a part of a document feed path; and
   a position-changing unit that is provided on the base frame and configured to change a position of at least one selected from the pickup unit and the friction unit to release the nip,
   wherein the friction unit is movable between a first position where the friction unit contacts the pickup unit to maintain the nip and a second position where the friction unit is separated from the pickup unit to release the nip, and
   the position-changing unit is configured to manually move the friction unit from the first position to the second position, and
   wherein the position-changing unit further comprises:
      a pressure rod that is contactable with the friction unit and presses the friction unit to move the friction unit from the first position to the second position,
      a pressure lever that comprises a manipulation part for a user's manipulation and presses the pressure rod in order for the pressure rod to press the friction unit when an external force is applied to the manipulation part,
      an elastic unit that, when the pressure of the pressure rod on the friction unit is removed, applies an elastic force to the pressure rod in order for the pressure rod to return to its position before the pressure, and
      a connection link that is disposed between the pressure rod and the pressure lever and connects the pressure rod and the pressure lever.

14. The scanning device of claim 13, wherein the connection link comprises a second contact part that contacts an end portion of the pressure rod in a longitudinal direction of the pressure rod and a third contact part that contacts the pressure lever,
   wherein the connection link may pivot about a pivotal axis that is formed between the second contact part and the third contact part.

15. The scanning device of claim 14, wherein the third contact part comprises a second pressure section that is pressed by the pressure lever when the friction unit is located at the second position,
   wherein the second pressure section comprises a second locking section that prevents a position of the pressure lever from being changed and a second half locking section that allows the position of the pressure lever to be changed.

16. The scanning device of claim 14, wherein when the cover is closed, the pressure lever contacts the cover and pivots to remove the pressure on the connection link.

17. An image forming apparatus comprising:
   a scanning device that comprises:
      a base frame that comprises a supply tray on which a document is loadable to be scanned by the scanning device,
      a pickup unit that is provided on the base frame of the scanning device and configured to pick up the document loaded on the supply tray, and to feed the picked-up document,
      a friction unit on the base frame of the scanning device disposed to face the pickup unit to form a nip with the pickup unit, and configured to apply a frictional force to a rear surface of the document that is passing through the nip,
      a readout unit configured to read out an image from a side of the document that has passed through the nip,
      a cover that is pivotably provided on the base frame of the scanning device and configured to open at least a part of a document feed path without releasing the formed nip, and
      a position-changing unit on the base frame of the scanning device and configured to change a position of at least one selected from the pickup unit and the friction unit to release the formed nip after the cover opens at least a part of a document feed path; and
   a printing unit that forms an image on a recording medium.

18. The image forming apparatus of claim 17, wherein the friction unit is movable between a first position where the friction unit contacts the pickup unit to maintain the nip and a second position where the friction unit is separated from the pickup unit to release the nip,
   wherein the position-changing unit comprises:
      a pressure rod that is contactable with the friction unit to manually move the friction unit from the first position to the second position and presses the friction unit to move the friction unit from the first position to the second position; and
      a pressure lever that comprises a manipulation part for a user's manipulation and presses the pressure rod in order for the pressure rod to press the friction unit when an external force is applied to the manipulation part.

19. The image forming apparatus of claim 18, wherein the position-changing unit further comprises a connection link that is disposed between the pressure rod and the pressure lever and connects the pressure rod and the pressure lever.

20. The image forming apparatus of claim 17, wherein the pickup unit comprises a third position where the pickup unit contacts the friction unit to maintain the nip and a fourth position where the pickup unit is separated from the friction unit to release the nip, wherein the position-changing unit comprises a movable frame on which the pickup unit is mounted and that is pivotable about a pivot shaft that is provided on one end portion of the movable frame and is disposed in a direction parallel to the document feed direction, to manually move the pickup unit between the third position and the fourth position.

\* \* \* \* \*